United States Patent [19]

Togai et al.

[11] Patent Number: 5,400,865
[45] Date of Patent: Mar. 28, 1995

[54] ENGINE OUTPUT CONTROL APPARATUS

[75] Inventors: Kazuhide Togai, Takatsuki; Yoshiaki Danno, Kyoto; Masato Yoshida, Kyoto; Makoto Shimada, Kyoto; Katsunori Ueda, Kyoto, all of Japan

[73] Assignee: Mitsubishi Jidosha Kogyo Kabushiki Kaisha, Japan

[21] Appl. No.: 180,464

[22] Filed: Jan. 12, 1994

Related U.S. Application Data

[63] Continuation of Ser. No. 899,174, Jun. 15, 1992, abandoned, which is a continuation of Ser. No. 582,184, Sep. 27, 1990, abandoned.

[30] Foreign Application Priority Data

Jan. 31, 1989 [JP] Japan .................. 1-21279
Jan. 31, 1989 [JP] Japan .................. 1-21281
Jan. 31, 1989 [JP] Japan .................. 1-21282
Jan. 31, 1989 [JP] Japan .................. 1-21283

[51] Int. Cl.$^6$ ............................ B60K 13/02
[52] U.S. Cl. .................. 180/197; 180/170; 123/403; 364/426.03; 364/426.04
[58] Field of Search ............ 180/197, 170, 175, 176, 180/177, 178, 179; 364/424.01, 424.05, 426.04, 426.03; 123/345, 346, 349, 394, 403

[56] References Cited

U.S. PATENT DOCUMENTS

| | | | |
|---|---|---|---|
| 4,714,864 | 12/1987 | Yogo et al. | 364/426.04 |
| 4,776,420 | 10/1988 | Seibert | 180/197 |
| 4,858,715 | 8/1989 | Tominaga | 180/197 |
| 4,884,651 | 12/1989 | Harada et al. | 364/426.03 |
| 4,913,251 | 4/1990 | Farr | 180/175 |
| 4,953,093 | 8/1990 | Etoh | 180/197 |
| 4,969,103 | 11/1990 | Maekawa | 364/426.04 |
| 4,987,966 | 1/1991 | Fujita | 180/170 |
| 5,067,578 | 11/1991 | Shirata et al. | 180/197 |

FOREIGN PATENT DOCUMENTS

| | | |
|---|---|---|
| 3844121 | 7/1989 | Germany . |
| 57-102534 | 6/1982 | Japan . |
| 61-75023 | 4/1986 | Japan . |
| 61-135945 | 6/1986 | Japan . |
| 61-287829 | 12/1986 | Japan . |
| 64-28035 | 1/1989 | Japan . |

OTHER PUBLICATIONS

Decision T 331/87.
Communication pursuant to Article 96(2) and Rule 51(2) EPC.

*Primary Examiner*—Margaret A. Focarino
*Assistant Examiner*—Anne Marie Boehler
*Attorney, Agent, or Firm*—Evenson, McKeown, Edwards & Lenahan

[57] ABSTRACT

An engine output control apparatus is used on a vehicle having an engine driven by a drive-by-wire system and includes a device for setting a first target engine control amount in accordance with an amount of operation of a manually operated engine control member; a device for detecting wheel slippage and for setting a second target engine control amount at which wheel slippage is reduced when wheel slippage exceeds a predetermined value; a device for setting a third target engine control amount at which constant-speed running of the vehicle is maintained when a manually operated constant-speed control member is actuated; and a selecting device for selecting one of the first, second, and third target engine control amounts. The selection made by the selecting device is based upon a determination of whether wheel slippage has exceeded a predetermined value and whether the manually operated constant-speed control member has been actuated. A setting device is provided for setting the engine output control amount based upon the target engine control amount selected by the selecting device.

21 Claims, 18 Drawing Sheets

ENGINE OUTPUT CONTROL APPARATUS

This application is a continuation of U.S. application Ser. No. 07/899,174, filed Jun. 15, 1992, now abandoned, which is a continuation of Ser. No. 07/582,184, abandoned.

TECHNICAL FIELD

The present invention relates to an engine output control apparatus of the type that the output of an engine mounted on a vehicle such as an automobile is controlled by a throttle valve driven, for example, by a drive-by-wire system.

BACKGROUND ART

As output control apparatus for an engine mounted on a vehicle such as an automobile, those referred to as "Drive-By-Wire" systems, have been developed and are finding actual utility.

In general, they are of the type that the depressed position of an accelerator pedal (the amount of operation of the accelerator pedal) is detected without mechanically connecting the accelerator pedal to a throttle valve, a target drive shaft torque is determined from the position thus detected, and the throttle valve is driven by a motor so as to obtain such a target drive shaft torque.

According to the drive-by-wire system, the degree of opening of the throttle valve can be controlled based not only on the amount of operation of the accelerator pedal but also on various other data and hence the control of the output of the engine can be practiced from various facets.

Application examples of the drive-by-wire system include control for bringing the relation between the operation of the accelerator pedal and the output of the engine into conformity with given conditions determined in view of the driver's feeling and the movement of the vehicle, that is, so-called throttle-by-wire control.

In addition, there is also traction control wherein whenever a slip occurs at a wheel, the degree of opening of the throttle valve is reduced in spite of the depressed accelerator pedal to thereby cease the slip.

Also included is auto-cruise control which allows to maintain a desired speed even while accelerator pedal is at the released position.

It will therefore be convenient if all the three kinds of controls, i.e., the throttle-by-wire control, the traction control and the auto-cruise control would be successfully performed by a single unit of drive-by-wire system.

It is however the throttle valve that serves as a final operation means for each control. Moreover, only one throttle valve is generally provided. Practice of all the above controls by such a single unit is therefore accompanied by the problem that the control of the opening degree of the throttle valve becomes complex.

With the foregoing in view, this invention has as a principal object thereby the provision of control apparatus of the type that accelerator-by-wire control, traction control system and auto-cruise control can all be performed by the apparatus without complication of the controls.

DISCLOSURE OF THE INVENTION

The engine output control apparatus disclosed is to achieve the above-described object. The engine output control apparatus is suitable for use in a vehicle, which is equipped with an engine output adjusting means for adjusting the output of an engine and an engine output control means for controlling the engine output adjusting means based on the amount of control of an engine output so as to transmit the output of the engine to a drive shaft, which comprises:

a first target-amount-of-control setting means for setting a first target amount of control according to the amount of operation of a manually-operated member;

a second target-amount-of-control setting means for setting a second target amount of control capable of ceasing a slip of at least one wheel, said second target amount of control being of the same kind as the first target amount of control;

a third target-amount-of-control setting means for setting a third target amount of control required to permit constant-speed running of the vehicle, said third target amount of control being of the same kind as the first target amount of control and the second target amount of control;

a target-amount-of-control selecting means for selecting one of the first, second and third target control amounts according to an operation mode of the vehicle; and an amount-of-control-of-engine-output setting means for setting the amount of control of the engine output based on the target amount of control selected by the target-amount-of-control selecting means.

Incidentally, a throttle valve of the drive-by-wire system can be used as the engine output adjusting means, and the degree of opening of the throttle valve can be employed as the engine output control amount. In addition, an accelerator pedal can be used as the manually-operated member.

Further, any one of the degree of opening of the throttle valve, the amount intake of air to the engine, an engine output torque and a drive shaft torque can be used as each of the first, second and third target control amounts described above.

The engine output control apparatus is suitable for use in a vehicle which is equipped with an engine output adjusting means for adjusting the output of an engine and an engine output control means for controlling the engine output adjusting means based on the amount of control of the engine output so as to transmit the output of the engine to a drive shaft, which comprises:

a first target-amount-of-control setting means for setting a first target amount of control corresponding to the amount of operation of a manually-operated member, said first target amount of control being of the same kind as the engine output control amount;

a second target-amount-of-control setting means for setting a second target amount of control capable of ceasing a slip of at least one wheel, said second target amount of control being of the same kind as the engine output control amount;

a third target-amount-of-control setting means for setting a third target amount of control required to permit constant-speed running the vehicle, said third target amount of control being of the same kind as the engine output control amount; and a target-amount-of-control selecting means for selecting, as the engine output control amount, one of the first, second and third target control amounts according to an operation mode of the vehicle.

In the engine output control apparatus, the first target-amount-of-control setting means sets the first target control amount corresponding to the amount of operation of the manually-operated member. The second target-amount-of-control setting means sets the second target control amount which is capable of ceasing the slip of the at lease one wheel and is of the same kind as the first target control amount. The third target-amount-of-control setting means sets the third target control amount which is required to permit constant-speed running of the vehicle and is of the same kind as the first and second target control amounts. Further, the target-amount-of-control selecting means selects one of the first, second and third target control amounts according to the operation mode of the vehicle and then sets the engine output control amount with the amount-of-control-of-engine-output setting means based on the target control amount selected by the target-amount-of-control selecting means. Then, the output of the engine is adjusted by the engine output adjusting means under the control of the engine output control means based on the engine output control amount.

In the engine output control apparatus, the first target-amount-of-control setting means sets the first target control amount which corresponds to the amount of operation of the manually-operated member and is of the same kind as the engine output control amount. The second target-amount-of-control setting means sets the second target control amount which is capable of ceasing the slip of the at lease one wheel and is of the same kind as the engine output control amount. The third target-amount-of-control setting means sets the third target control amount required to permit constant-speed running of the vehicle and is of the same kind as the engine output control amount. Further, the target-amount-of-control selecting means selects, as the engine output control amount, one of the first, second and third target control amounts according to the operation mode of the vehicle. Then, the output of the engine is adjusted by the engine output adjusting means under the control of the engine output control means based on the engine output control amount.

BRIEF DESCRIPTION OF THE DRAWINGS

FIGS. 1 through 6 illustrate an engine output control apparatus according to a first embodiment of this invention, in which:

FIG. 1 is a schematic diagram showing the structure of a vehicle equipped with the engine output control apparatus;

FIG. 2 is a fragmentary block diagram specifically depicting the structure of FIG. 1;

FIG. 3 is a graph showing conditions for determining the target degree of opening of a throttle in the control apparatus;

FIG. 4 is a graph for describing data used to calculate a reference output torque of an engine in the control apparatus;

FIG. 5 is a graph for describing data used to calculate the reference degree of opening of the throttle in the control apparatus; and FIG. 6 is a flow chart for explaining the operation of the control apparatus;

FIGS. 7 through 11 show an engine output control apparatus according to a second embodiment of this invention, in which:

FIG. 7 is a schematic diagram showing the structure of a vehicle equipped with the control apparatus;

FIG. 8 is a fragmentary block diagram specifically depicting the structure of FIG. 7;

FIG. 9 is a graph illustrating conditions for determining a target amount of intake air in the control apparatus;

FIG. 10 is a block diagram specifically showing the structure of a target-degree-of-opening-of-throttle calculating unit in the control apparatus; and FIG. 11 is a flow chart for describing the operation of the control apparatus;

FIGS. 12 through 15 illustrate an engine output control apparatus according to a third embodiment of this invention, in which:

FIG. 12 is a schematic diagram showing the structure of a vehicle equipped with the control apparatus;

FIG. 13 is a fragmentary block diagram specifically depicting the structure of FIG. 12;

FIG. 14 is a graph showing conditions for determining a target engine output torque in the control apparatus; and FIG. 15 is a flow chart for describing the operation of the control apparatus;

FIGS. 16 through 20 depict an engine output control apparatus according to a fourth embodiment of this invention, in which:

FIG. 16 is a schematic diagram showing the structure of a vehicle equipped with the control apparatus;

FIG. 17 is a fragmentary block diagram specifically depicting the structure of FIG. 16;

FIG. 18 is a graph showing conditions for determining a target drive shaft torque in the control apparatus;

FIG. 19 is a graph for describing data used to calculate an actual drive shaft torque in the control apparatus; and FIG. 20 is a flow chart for describing the operation of the control apparatus.

BEST MODE FOR CARRYING OUT THE INVENTION

The embodiments of this invention will hereinafter be described with reference to the accompanying drawings. Here, a description will however be made of four embodiments of from first to fourth embodiments.

A description will first be made of an engine output control apparatus according to the first embodiment of this invention with reference to FIGS. 1 through 6.

Figure 1:
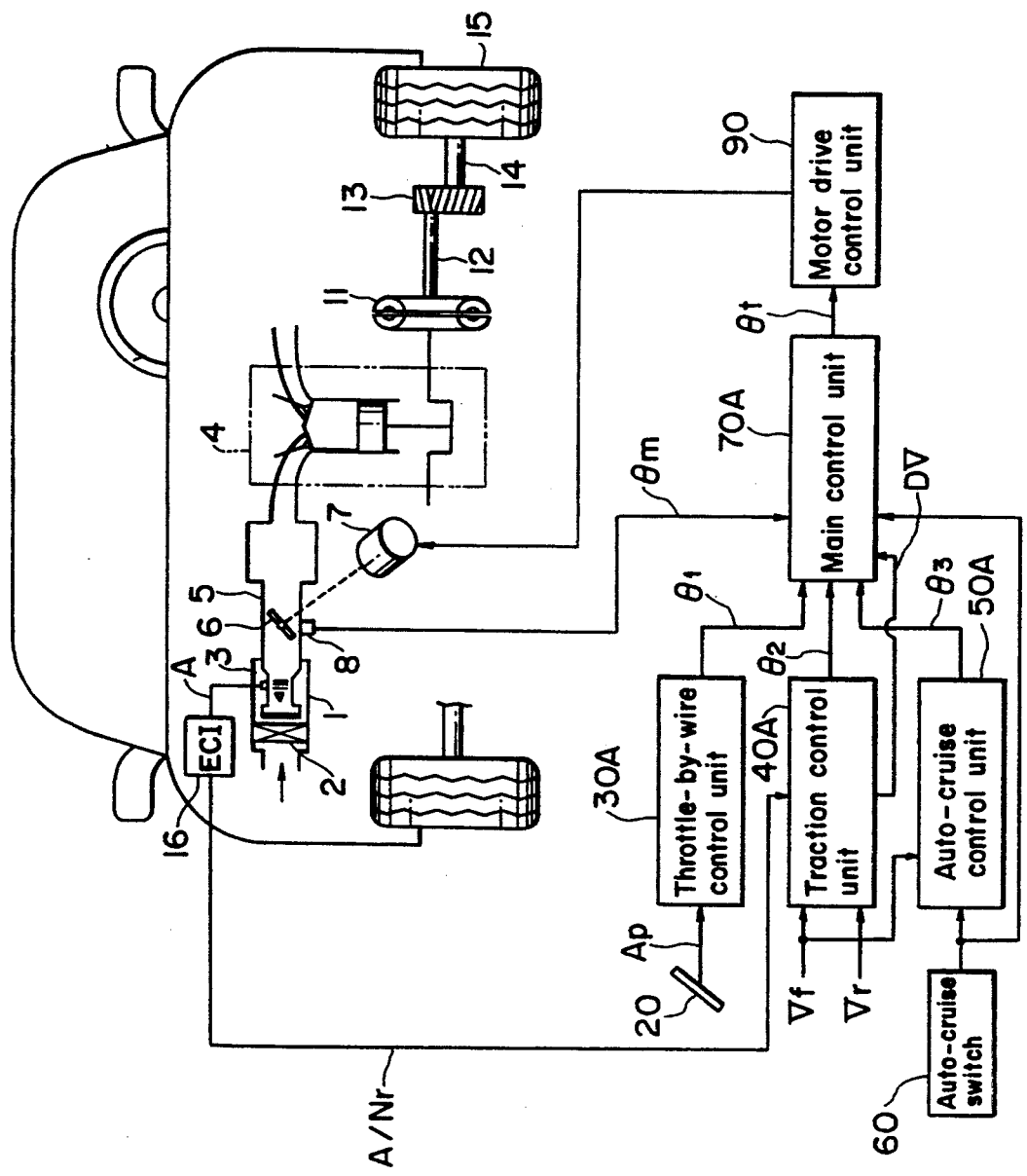

FIG. 1 is a schematic diagram showing the structure of a vehicle equipped with the engine output control apparatus. In FIG. 1, designated at numeral 1 is an air cleaner, which has an element 2 and an air flow sensor 3. The air flow sensor 3 is used to detect the amount of intake air taken in through the element 2.

An intake passage 5 for introducing combustion air therethrough is provided over the entire range of from the air cleaner 1 to an engine body 4. A throttle valve 6 as an engine output adjusting means, which is driven by the so-called drive-by-wire control system, is provided at an intermediate point of the intake passage 5. The opening degree $\theta$ of the throttle valve 6 serves as a direct parameter for controlling the engine output, i.e., as an engine output control amount.

The throttle valve 6 serves to adjust the amount of air which flows through the intake passage 5, and can smoothly rotate from a fully-closed position to a fully-open position. The throttle valve 6 has a rotary shaft which is coupled to a shaft of a step motor 7 so that the throttle valve is driven by the step motor 7. In addition, a throttle opening degree sensor 8 is attached to the rotary shaft of the throttle valve 6.

The throttle opening degree sensor 8 may be, for example, a potentiometer which outputs a signal of a voltage level corresponding to the opening degree $\theta$ of the throttle valve 6.

A pump of a torque converter 11 is connected to an output shaft of the engine body 4 and a shaft 12 is connected to a turbine of the torque converter 11. In addition, a drive shaft 14 is connected to the shaft 12 via a transmission 13, and drive wheels 15 are mounted on the drive shaft 14.

Incidentally, the torque converter 11, the shaft 12 and the transmission 13 make up an automatic transmission.

An intake air amount A detected by the air flow sensor 3 is delivered to an engine control computer (hereinafter called "ECI") 16. At the ECI 16, an intake air amount (actual intake air amount) per engine revolution A/Nr is calculated for each and every predetermined crank angle, and fuel in an amount determined commensurate with the intake air amount A/Nr is injected into individual cylinders of the engine body 4.

Further, the intake air amount A/Nr calculated by the ECI 16 is also delivered to a traction control unit 40A to be described later.

Regarding the unit of the intake air amount, the intake air amount per engine revolution A/N will also be in the following description.

On the other hand, designated at numeral 20 is an accelerator pedal which is a connected to a throttle-by-wire (TBW) control unit 30A.

The throttle-by-wire control unit 30A is adapted to set the control amount to be used for the so-called throttle-by-wire control, and corresponds to the first target-amount-of-control setting means. In addition, the throttle-by-wire control unit 30A detects the depressed position Ap of the accelerator pedal 20 as the amount of operation of the accelerator pedal 20 to determine a first target opening degree $\theta_1$ of the throttle as a first target control amount corresponding to the position Ap thus detected.

Designated at numeral 40A is a traction control (TRC) unit, which is adapted to set the control amount to be used for the traction control. The traction control unit 40A corresponds to the second target-amount-of-control setting means, and detects a slip of each wheel (drive wheel) based on the speed Vf of follower wheels and the speed Vr of the drive wheels, each detected by an unillustrated sensor so as to determine a second target opening degree $\theta_2$ of the throttle as the second target control amount which makes it possible to cease the slip.

Designated at numeral 50A is an auto-cruise (ASC) control unit, which is adapted to set the control amount to be used for the auto-cruise control. In addition, the auto-cruise control unit. 50A corresponds to the third target-amount-of-control setting means and determines a third target opening degree $\theta_3$ of the throttle as the third target control amount required to make constant the vehicle speed, i.e., to allow the vehicle to run at a constant speed when the auto-cruise mode (ASC mode) is established by the operation of an auto-cruise switch 60.

Each of the first, second and third target opening degrees $\theta_1$, $\theta_2$, $\theta_3$ of the throttle determined or obtained by the above-described control units 30A, 40A and 50A is transmitted to a main control unit 70A.

The main control unit 70A has the function of selecting one of the target opening degrees $\theta_1$, $\theta_2$, $\theta_3$ according to at least one operation mode for thereby setting the same as a target opening degree $\theta_t$ of the throttle.

As the operation modes, may be mentioned an auto-cruise mode to be set by the operation of the auto-cruise switch 60 and a traction mode (TRC mode) to be set when the amount of slip DV determined by the traction control unit 40A exceeds a predetermined value.

The target opening degree $\theta_t$ of the throttle, which has been selected and set by the main control unit 70A, is inputted to a motor drive control unit 90.

The motor drive control unit 90 delivers as many drive pulses as corresponding to the target opening degree $\theta_t$ to the step motor 7 for thereby driving the same and sets the degree of opening of the throttle valve 6 such that it conforms with the target opening degree $\theta_t$ of the throttle comprises the motor drive control unit 90 and the step motor 7 make up a control means (engine output control means) for controlling the throttle valve 6.

Figure 2:
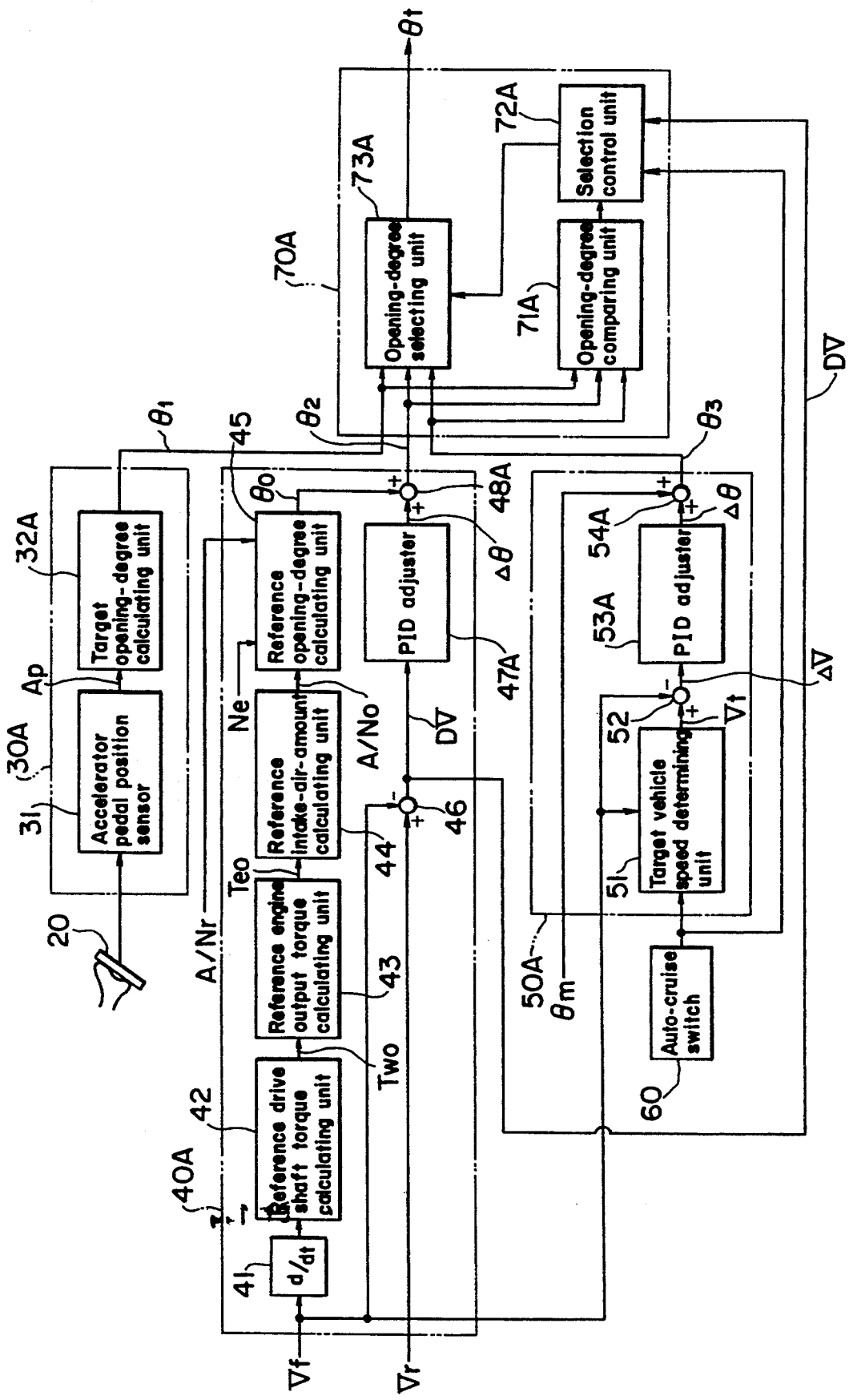

FIG. 2 specifically shows the structure of the throttle-by-wire control unit 30A through the motor drive control unit 90.

The throttle-by-wire control unit 30A is composed of an accelerator pedal position sensor 31 and a target-degree-of-opening-of-throttle calculating unit 32A.

The accelerator pedal position sensor 31 is adapted to detect the depressed position Ap of the accelerator pedal 20 and to output a signal of a voltage level corresponding to the depressed position Ap by using, for example, a potentiometer.

Figure 3:
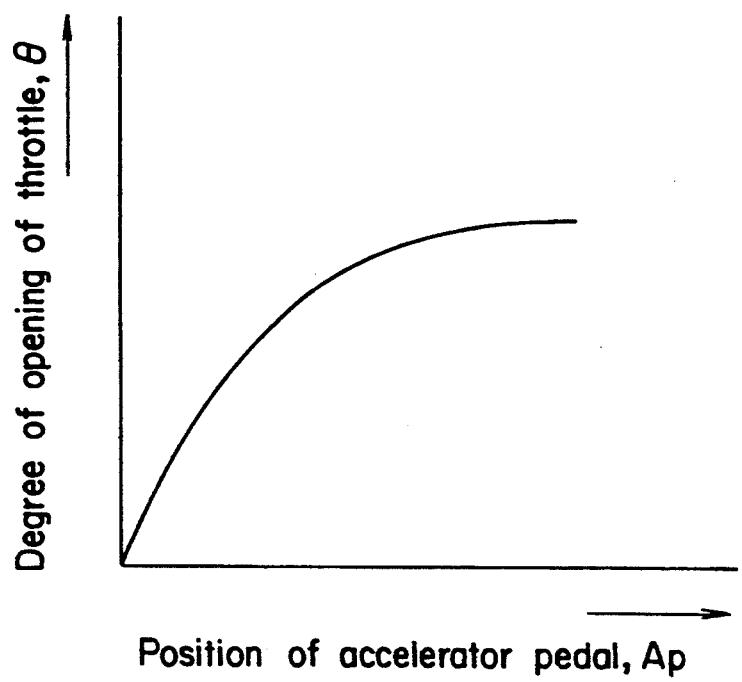

The target-degree-of-opening-of-throttle calculating unit 32A stores therein, as a function, the data shown in FIG. 3 as conditions for the determination of the degree of opening of the throttle corresponding to the position Ap of the accelerator pedal. In addition, the target-degree-of-opening-throttle calculating unit 32A calculates the first target opening degree $\theta_1$ of the throttle based on the function thus stored and the depressed position Ap detected by the accelerator pedal position sensor 31 to thereby determine the same.

The traction control unit 40A comprises a differentiator 41 for determining the acceleration of the vehicle body from the speed Vf of the follower wheels, a reference drive shaft torque calculating unit 42 for calculating a transmittable-to-road reference drive shaft torque Two from the acceleration of the vehicle body determined by the differentiator 41 and the body weight W and wheel diameter R which have been stored therein as data in advance, a reference engine output torque calculating unit 43 for calculating a reference engine output torque Teo from the reference drive shaft torque Two calculated by the reference drive shaft torque calculating unit 42, a reference intake-air-amount calculating unit 44 for calculating a reference amount of intake air A/Nt from the reference engine output torque Teo calculated by the reference engine output torque calculating unit 43, a reference-degree-of-opening-of-throttle calculating unit 45 for calculating a reference opening degree $\theta 0$ of the throttle from the reference amount of intake air A/N determined by the reference intake-air-amount calculating unit 44 and the number of revolutions of the engine (=engine speed) Ne, a subtracting unit 46 for subtracting the speed Vf of the follower wheels from the speed Vr of the drive wheels to determine the amount of slip DV (=Vr−Vf), a PID adjuster 47A for calculating a feedback operation amount $\Delta \theta$ (the amount of opening degree of throttle) from the amount of slip DV obtained by the subtracting unit 46, and an adding unit 48A for adding the operation amount $\Delta\theta$ obtained by the PID adjuster 47A as a correction value to the reference opening degree $\theta_0$ of the throttle. In the traction control unit 40A, the second target opening degree $\theta_2$ of the throttle is obtained based on the reference opening degree $\theta_0$ of the throttle and from the feedback of the amount of slip DV.

The reference engine output torque calculating unit 43 calculates the reference engine output torque Teo required to obtain the reference drive shaft torque Two by considering a gear ratio $\rho$ of the transmission 13 and a torque ratio $\tau$ of the torque converter 11 from the following formula:

$$Teo = Two/(\rho\tau)$$

Figure 4:
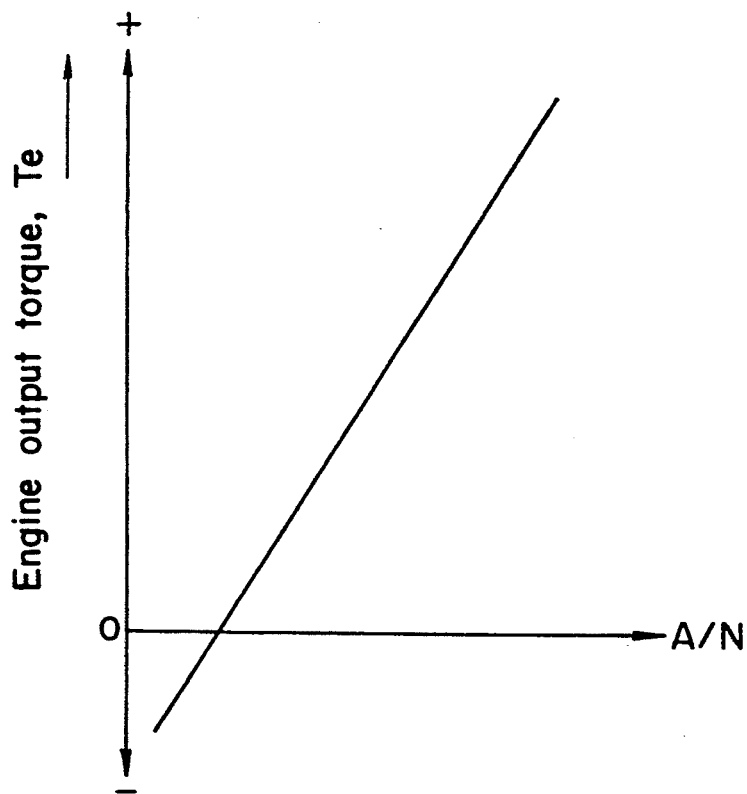

The reference intake-air-amount calculating unit 44 stores therein, as a map (a characteristic graph of the amount of intake air A/N vs. engine output torque Te), information about the relation shown in FIG. 4 between the amount of intake air A/N and the engine output torque Te. A reference intake-air-amount A/No corresponding to the reference engine output torque Teo is determined based on the map. Incidentally, in this case, information about the relation between the amount of intake air A/N and the engine output torque Te shown in FIG. 4 is stored as a numerical expression in the reference intake-air-amount calculating unit 44 and the reference intake-air-amount A/No may of course be calculated by using this numerical formula.

Figure 5:
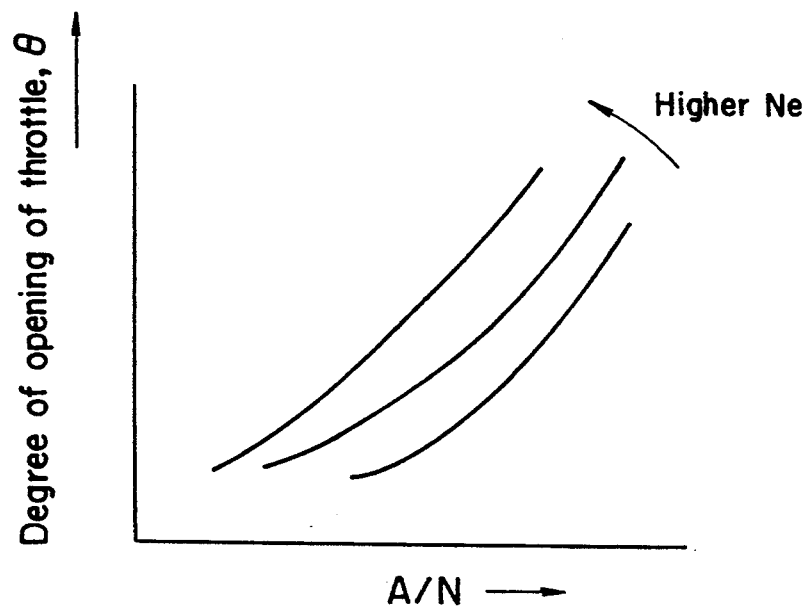

The reference-degree-of-opening-of-throttle calculating unit 45 calculates the reference opening degree $\theta_0$ of the throttle corresponding to the reference intake-air-amount A/No based on the relation shown in FIG. 5 between the amount of intake air A/N and the opening degree $\theta$ of the throttle in the case where the engine speed Ne is set as a parameter.

In addition, the reference-degree-of-opening-of-throttle calculating unit 45 serves to feed back the amount of intake air A/Nr as a correction value upon calculation of the degree of opening of the throttle.

The auto-cruise control unit 50A comprises a target vehicle speed determining unit 51 for determining the speed Vf of the follower wheels as a target vehicle speed Vt at the time that the auto-cruise mode is established by the auto-cruise switch 60, a subtracting unit 52 for subtracting the speed Vf of the follower wheels from the target speed Vt determined by the target vehicle speed determining unit 51 to obtain a speed deviation $\Delta V$ therebetween, a PID adjuster 53A for calculating the amount of operation of feedback $\Delta\theta$ (the amount of opening degree of the throttle) from the speed deviation $\Delta V$ obtained by the subtracting unit 52, and an adding unit 54A for adding, as a correction value, the feedback operation amount $\Delta\theta$ obtained by the PID adjuster 53A to the opening degree $\theta m$ (current opening degree) to be detected by the throttle opening degree sensor 8. The auto-cruise control unit 50A also determines a third target opening degree $\theta_3$ of the throttle based on the detection opening degree $\theta_m$ and the feedback of the speed deviation $\Delta V$.

The main control unit 70A comprises a degree-of-opening-of-throttle selecting unit 73A as a target-amount-of-control selecting means for selectively outputting one of the target opening degrees $\theta_1$, $\theta_2$, $\theta_3$ of the throttle, which have been delivered from the control units 30A, 40A, 50A, respectively, according to a command from a selection control unit 72A which will be described later, a degree-of-opening-of-throttle comparing unit 71A for performing a comparison among the values of the target opening degrees $\theta_1$, $\theta_2$ and $\theta_3$, and the selection control unit 72A for controlling the selecting operation of the selecting unit 73A according to the comparison result from the comparing unit 71A and the operation mode based on the operation of the auto-cruise switch 60 and the value of the slip amount DV from the traction control unit 40A.

In the present embodiment, since the target amount of control and the amount of control of the engine output are both associated with the opening degree $\theta$ of throttle, the selecting unit 73A sets a target opening degree $\theta_i$ of throttle which is equivalent to the selected target amount of control, as the amount of control of the engine output, i.e., the target degree of opening of throttle, and outputs therefrom a target opening degree $\theta_t$ of the throttle as the amount of control of the engine output.

The engine output control apparatus according to the first embodiment of this invention is constructed as described above.

Figure 6:
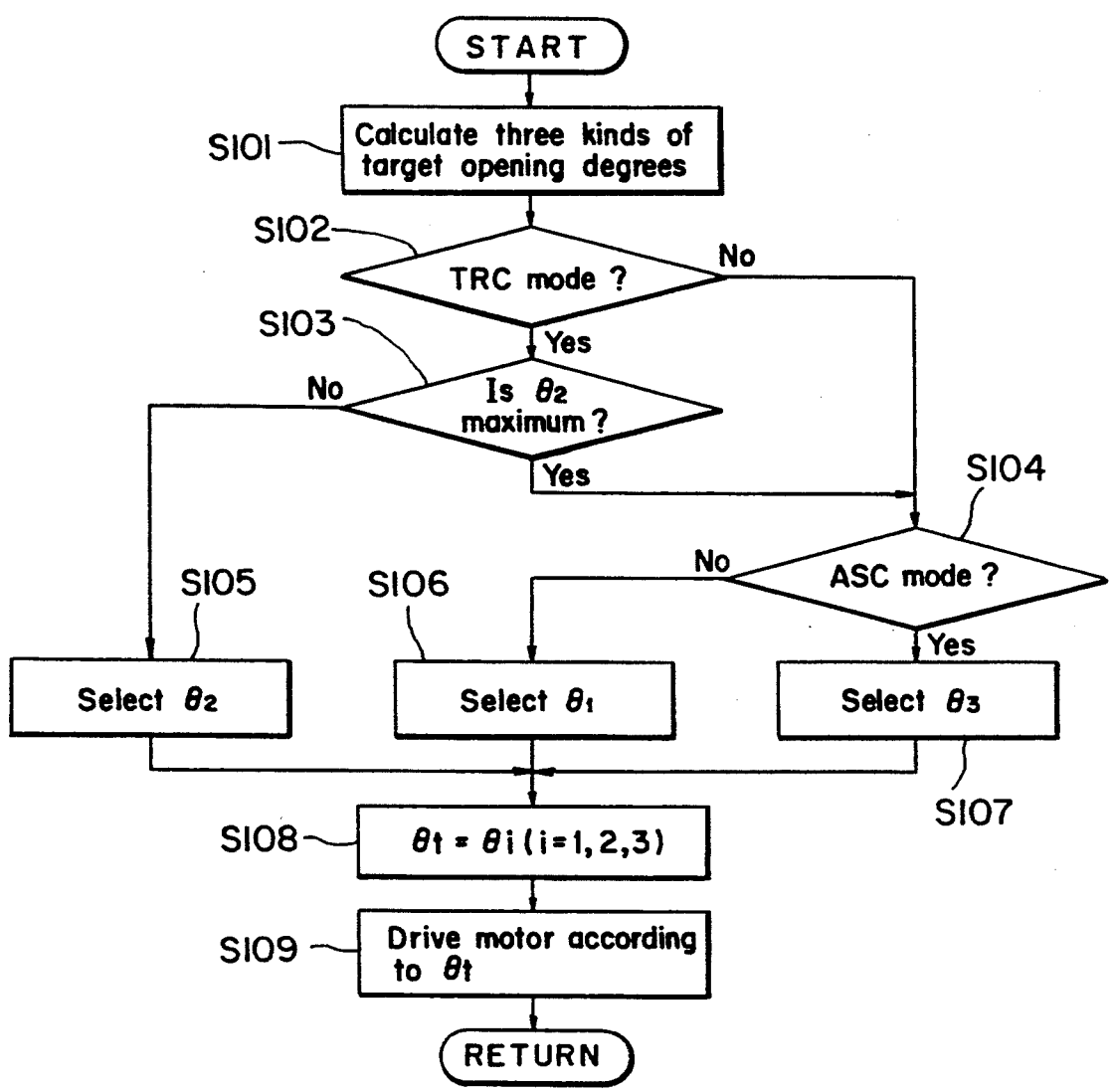

A description will now be made of the operation of the apparatus with reference to FIG. 6.

Each of the first, second and third target opening degrees of the throttle is first determined or calculated in Step 101.

In other words, when the accelerator pedal 20 is depressed, the accelerator pedal position sensor 31 in the throttle-by-wire control unit 30A detects the depressed position Ap of the accelerator pedal 20. Then, the target-degree-of-opening-of-throttle calculating unit 32A determines the first target opening degree $\theta_1$ according to the depressed position Ap.

The traction control unit 40A continuously monitors the slip amount DV as the difference between the speed Vr of the drive wheels and the speed Vf of the follower wheels to determine the second target opening degree $\theta_2$ of throttle which can cease the slip.

Namely, the differentiator 41 serves to determine the acceleration of the vehicle body from the speed Vf of the follower wheels, and the reference drive shaft torque calculating unit 42 calculates a transmittable-to-road reference drive shaft torque Two from the acceleration of the vehicle body and the body weight W and wheel diameter R which have been stored as data in advance. Further, the reference engine output torque calculating unit 43 calculates the reference engine output torque Teo required to obtain the reference drive shaft torque Two thus calculated by considering the gear ratio $\rho$ of the transmission 13 and the torque ratio $\tau$ of the torque converter 11. Then, the reference intake-air-amount calculating unit 44 calculates the reference intake-air-amount A/No required to obtain the reference engine output torque Two, and the reference-degree-of-opening-of-throttle calculating unit 45 also calculates the reference opening degree $\theta 0$ of throttle required to obtain the reference intake-air-amount A/No so calculated.

At the same time, the subtracting unit 46 subtracts the speed Vf of the follower wheels from the speed Vr of the drive wheels to determine the amount of slip DV (=Vr−Vf), and the PID adjuster 47A determines the operation amount $\Delta\theta$ (the amount of degree of opening of throttle) of feedback from the slip amount DV.

Then, the adding unit 48A adds the operation amount $\Delta\theta$ thus obtained to the reference opening degree $\theta 80$ of throttle as a correction value to determine the second target opening degree $\theta_2$ from the added result.

On the other hand, the auto-cruise control unit 50A always monitors the state of the auto-cruise switch 60. When the auto-cruise switch 60 is operated to establish the auto-cruise mode, the target vehicle speed determining unit 51 determines the speed Vf of the follower wheels as the target vehicle speed Vt. Further, the subtracting unit 52 subtracts the speed Vf thereof from the target vehicle speed Vt thus determined to thereby obtain the speed deviation $\Delta V$. Then, the PID adjuster 53A obtains the operation amount $\Delta \theta$ of feedback from the speed deviation $\Delta V$. Next, the adding unit 54A adds the operation amount $\Delta \theta$ thus obtained, as the correction value, to the detection opening degree (current opening degree) $\theta m$ to determine the third target opening degree $\theta_3$ from the added result.

Incidentally, when the auto-cruise switch 60 is operated again to release the auto-cruise mode from the state of its establishment or when a brake pedal or accelerator pedal 20 of the vehicle is depressed, the auto-cruise control unit 50A detects whether or not the auto-cruise mode has been released therefrom or detects the state of depressing operation of the brake pedal or accelerator pedal 20 to thereby release the target vehicle speed Vt from the state of the above-described determination.

Each of the target opening degrees $\theta_1$, $\theta_2$, $\theta_3$ of throttle determined in the above-described manner is inputted to the main control unit 70A.

The main control unit 70A selects one of the target opening degrees $\theta_1$, $\theta_2$ and $\theta_3$ according to the operation mode.

Namely, it is first discriminated in Step 102 whether or not the operation mode is the TRC mode (traction mode). Incidentally, as described above, the TRC mode is established when the slip amount DV from the traction control unit 40A exceeds the predetermined value, but not established when the slip amount DV does not exceed the predetermined value.

Unless TRC mode has been established, the routine procedure proceeds to Step 104, but if it has not been established, the routine procedure proceeds to Step 103. In Step 103, the degree-of-opening-of-throttle comparing unit 71A performs a comparison among the values of the target opening degrees $\theta_1$, $\theta_2$ and $\theta_3$ from the control units 30A, 40A and 50A and makes a judgment as to whether or not the value of the second target opening degree $\theta_2$ associated with the TRC mode is the maximum.

If the value of $\theta_2$ is the maximum, the routine procedure advances to Step 104. If it is not, the routine procedure proceeds to Step 105 where the second target opening degree $\theta_2$ is selected as the target opening degree of throttle. Namely, if the condition that the value of the second target opening degree $\theta_2$ is smaller than any of the values of the remaining target opening degrees $\theta_1$, $\theta_3$ is met, the second target opening degree $\theta_2$ is chosen.

When the slip amount DV exceeds the predetermined value, the traction mode is established, at which time the traction control makes it necessary to set the second target opening degree $\theta_2$ such that the opening degree $\theta$ of throttle becomes smaller than the current opening degree thereby allowing the slip to cease. However, when the value of the second target opening degree $\theta_2$ is larger than that of each of the remaining target opening degrees $\theta_1$, $\theta_3$ of throttle, the use of either the target opening degree $\theta_1$ or $\theta_3$ rather than that of the second target opening degree $\theta_2$ is better fitted, from the standpoint of the traction control for the purpose of control that the slip be ceased. Therefore, the condition that "the value of the second target opening degree $\theta_2$ is not the maximum" is employed as a condition for the second target opening degree $\theta_2$ of throttle which can cease the slip.

On the other hand, when the routine procedure advances to Step 104, it is discriminated whether or not the auto-cruise mode (ASC mode) has been established by the auto-cruise switch 60.

When it is judged to be positive, the routine procedure proceeds to Step 107 where the third target opening degree $\theta_3$ of throttle is selected as the target opening degree of throttle.

When it is judged to be negative, the routine procedure advances to Step 106 where the first target opening degree $\theta_1$ is chosen as the target opening degree of throttle.

In this case, the ASC mode is set by the operation of the auto-cruise switch 60. However, when a command to release the auto-cruise mode is made by reoperation of the auto-cruise switch 60 or when the depression of the brake pedal or accelerator pedal 20 equivalent to the release command of the auto-cruise mode is effected, during running of the vehicle at a constant speed under the ASC mode, the auto-cruise mode is released and the selection of the third target opening degree $\theta_3$ is also released thereby finishing the running at the constant speed.

As described above, the selecting operation of one of the target opening degrees $\theta_1$, $\theta_2$ and $\theta_3$ of throttle is effected by the degree-of-opening-of-throttle selecting unit 73A which is operated by the control of the selection control unit 72A.

Then, the routine procedure advances to Step 108. The degree-of-opening-of-throttle selecting unit 73A sets the target opening degree $\theta_i$ (i = 1, 2, 3) of throttle as the target opening degree $\theta_t$ which serves as an amount of control for the engine output. This setting operation itself is however considered to include the selecting operation, as they are performed together.

Subsequently, in Step 109, the step motor 7 is driven according to the target opening degree $\theta_t$ of throttle so that an adjustment is made to bring the opening degree $\theta$ of the throttle valve 6 into conformity with the target opening degree $\theta_t$ of throttle.

As described above, the main control unit 70A selects the first target opening degree $\theta_1$ from the throttle-by-wire control unit 30A when the condition that the operation is in neither the traction mode nor the auto-cruise mode is met. The main control unit 70A selects the third target opening degree $\theta_3$ from the auto-cruise control unit 50A when the condition that the operation is not in the traction mode but is in the auto-cruise mode is met. Further, the main control unit 70A selects the second target opening degree $\theta_2$ of throttle when the condition that the traction mode is established and the value of the second target opening degree $\theta_2$ of throttle from the traction control unit 40A is not the maximum is met. However, the selection of either the first target opening degree $\theta_1$ of throttle or the third target opening degree $\theta_3$ of throttle is effected according to whether or not the operation mode is the auto-cruise mode if the value of the second target opening degree $\theta_2$ of throttle is the maximum even in the traction mode.

As a result, when the first target opening degree $\theta_1$ is selected, a drive shaft torque corresponding to the depressed position Ap of the accelerator pedal 20 is transmitted to the drive shaft 14 so that the so-called throttle-by-wire control of such a type that the drive shaft torque is exhibited as drive force at the wheels 15 is performed. Then, when the third target opening degree $\theta_3$ of throttle is selected, a drive shaft torque required to permit running of the vehicle at the constant speed is transmitted to the drive shaft 14 so that the so-called auto-cruise control of such a type that the vehicle runs at the constant speed of the target vehicle speed Vt is performed. Further, when the second target opening degree $\theta_2$ is chosen, a drive shaft torque which can cease the slip is transmitted to the drive shaft 14 so that the so-called traction control of such a type that the slip of the wheels ceases is performed.

As described above, the target opening degrees $\theta_1$, $\theta_2$ and $\theta_3$ of throttle, namely, the same kind of parameters are used as control parameters (target amounts of control) in the throttle-by-wire control, the traction control and the auto-cruise control, respectively and one of the target opening degrees $\theta_1$, $\theta_2$ and $\theta_3$ of throttle is selected according to their respective magnitudes and the operation mode of the vehicle. Thus, the function of each control can be fully exhibited without complication of the opening-degree control for the throttle valve 6. As a consequence, an improvement in safety or the like can be achieved owing to the traction control.

Accordingly, the present invention has the merit that the throttle-by-wire control, the traction control and the auto-cruise control can all be performed by a single drive-by-wire system unit.

An engine output control apparatus according to a second embodiment of this invention will next be described with reference to FIGS. 7 through 11.

Figure 7:
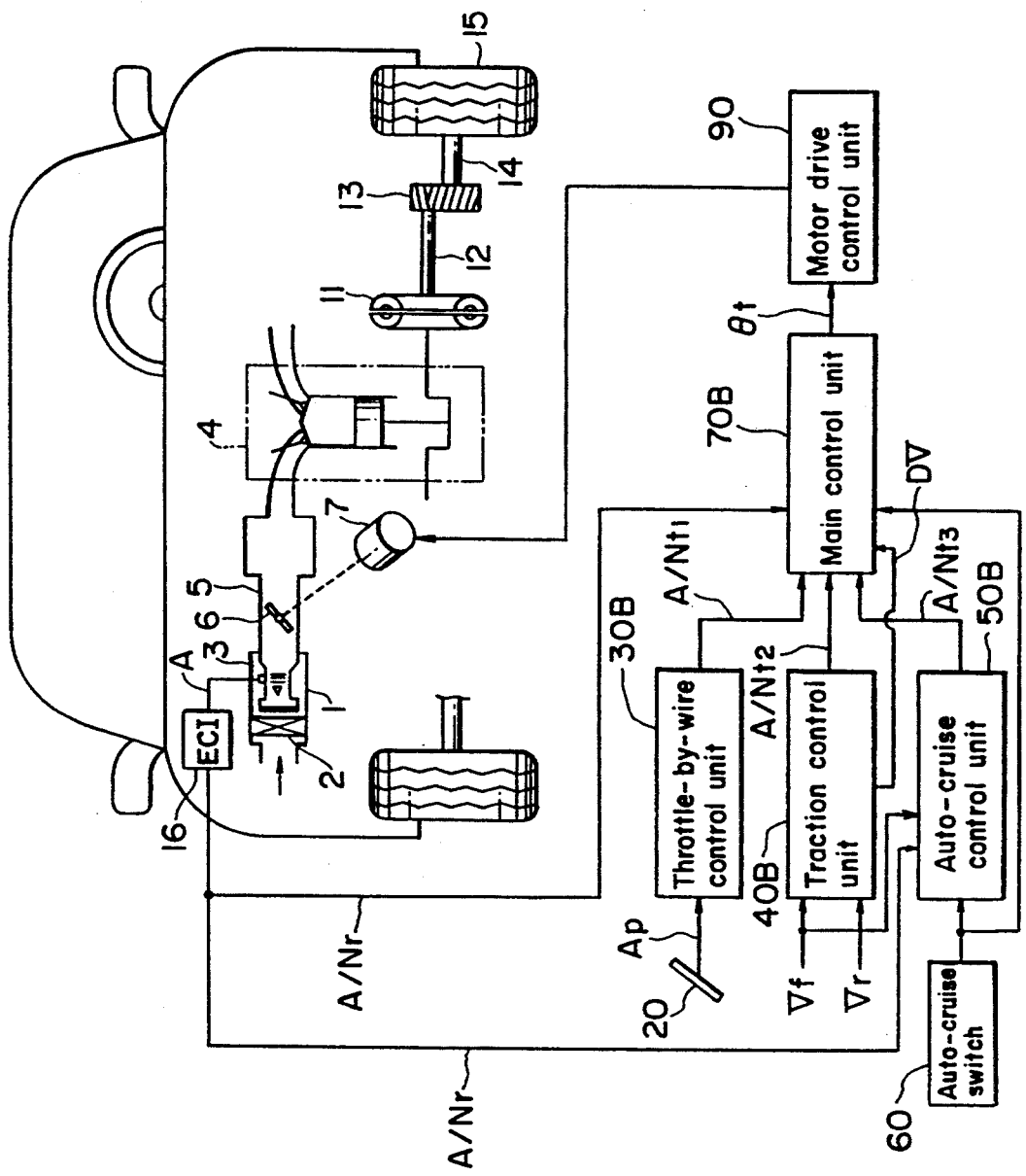

FIG. 7 is a schematic block diagram showing the construction of a vehicle equipped with the engine output control apparatus. In FIG. 7 and FIG. 1, like reference numerals designate like elements of structure and their description will be omitted in part.

The opening degree $\theta$ of the throttle valve 6 also serves as a direct parameter for controlling the engine output, i.e., the amount of control of the engine output in the present embodiment. In addition, the amount of intake air A is delivered to the ECI 16 where an intake air amount per engine revolution A/Nr is calculated every predetermined crank angle and delivered to desired units to be described later, such as an auto-cruise control unit 50B and a main control unit 70B.

Further, a throttle-by-wire (TBW) control unit 30B, a traction (TRC) control unit 40B, the auto-cruise (ASC) control unit 50B and the main control unit 70B employed in the present embodiment are different from their corresponding units in the first embodiment.

The structure of these elements will hereinafter be described with reference to FIG. 7.

Similarly to the preceding embodiment, the throttle-by-wire control unit 30B is adapted to set the control amount for throttle-by-wire control. It corresponds to the first target-amount-of-control setting means. In addition, the throttle-by-wire control unit 30B detects the depressed position Ap of the accelerator pedal 20 as the amount of depressing operation of the accelerator pedal 20 to thereby determine a first target intake air amount A/Nt$_1$ as the first target control amount corresponding to the depressed position Ap thus detected.

As described above, designated at numeral 40B is a traction control unit, which is adapted to set the control amount for traction control. The traction control unit 40B corresponds to the second target-amount-of-control setting means and detects a slip of at least one wheel (drive wheel) based on the speed Vf of follower wheels and the speed Vr of the drive wheels, each detected by an unillustrated sensor, so as to determine a second target intake air amount A/Nt$_2$ as the second target control amount which can cease the slip.

Designated at numeral 50B is an auto-cruise control unit, which is adapted to set a control amount for auto-cruise control. The auto-cruise control unit 50B corresponds to the third target-amount-of-control setting means and determines a third target intake air amount A/Nt$_3$ as the third target control amount required to make constant the vehicle speed, i.e., to permit running of the vehicle at the constant speed when the auto-cruise mode (ASC mode) is established by an auto-cruise switch 60.

Each of the target intake air amounts A/Nt$_1$, A/Nt$_2$, A/Nt$_3$ (also called merely "target air amount hereinafter") determined or calculated by the control units 30B, 40B, 50B respectively is delivered to a main control unit 70B.

The main control unit 70B has the function of selecting one of the target intake air amounts A/Nt$_1$, A/Nt$_2$ and A/Nt$_3$ according to at least one operation mode for thereby establishing a target opening degree $\theta_t$ of throttle based on the target intake air amount A/Nt thus selected.

Incidentally, operation modes may include an auto-cruise mode to be set by the auto-cruise switch 60 and a traction mode (TRC mode) to be set when the amount of slip DV determined by the traction control unit 40B exceeds a predetermined value.

The target opening degree $\theta_t$ of throttle established by the main control unit 70B is transmitted to a motor drive control unit 90 as a control-amount signal.

The motor drive control unit 90 is constructed in the same manner as described above.

Figure 8:
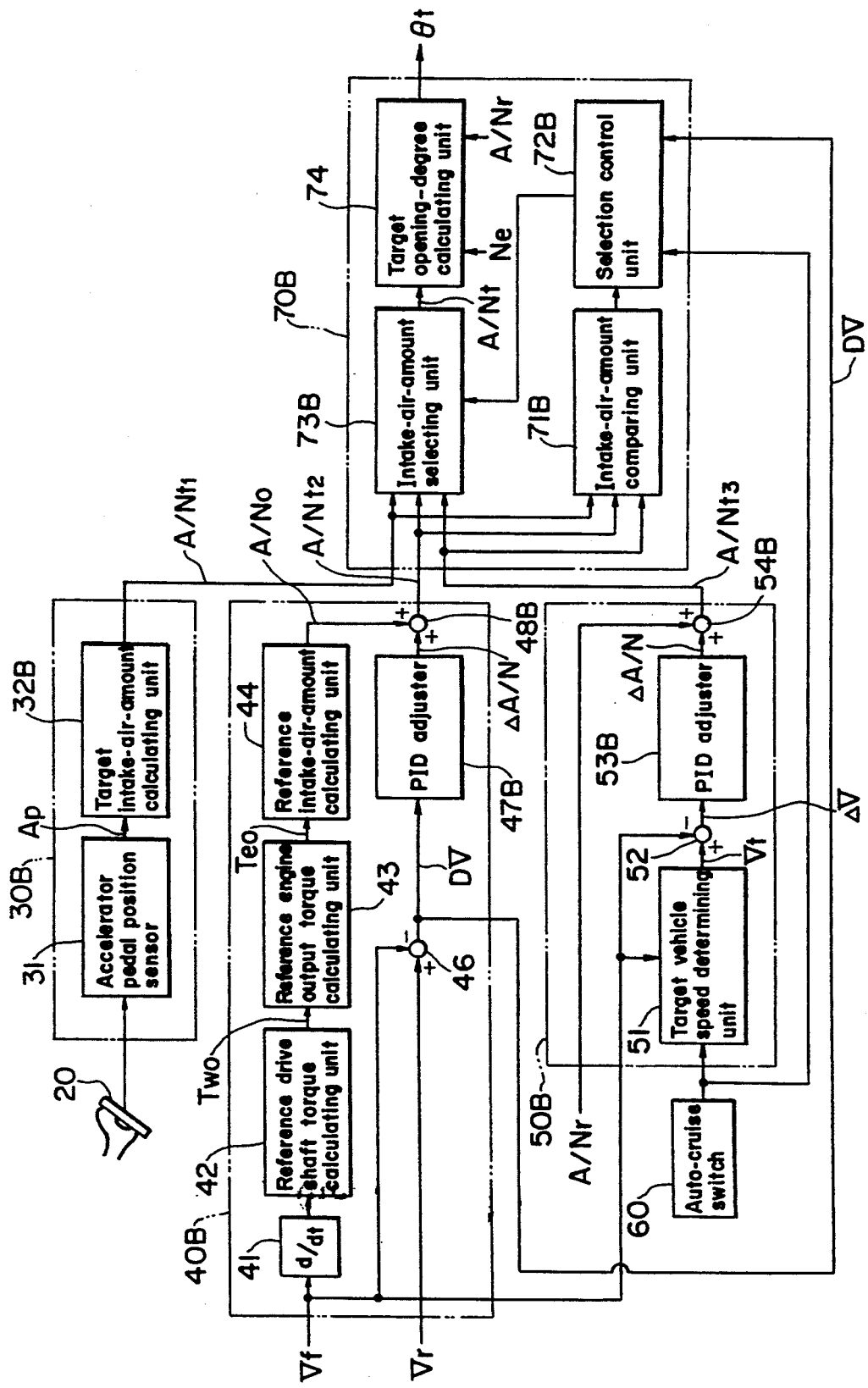

Next, FIG. 8 specifically shows the structure of the throttle-by-wire control unit 30B through the motor drive control unit 90.

The throttle-by-wire control unit 30B is composed of an accelerator pedal position sensor 31 and a target intake-air-amount calculating unit 32B.

The accelerator pedal position sensor 31 has the same structure as described above.

Figure 9:
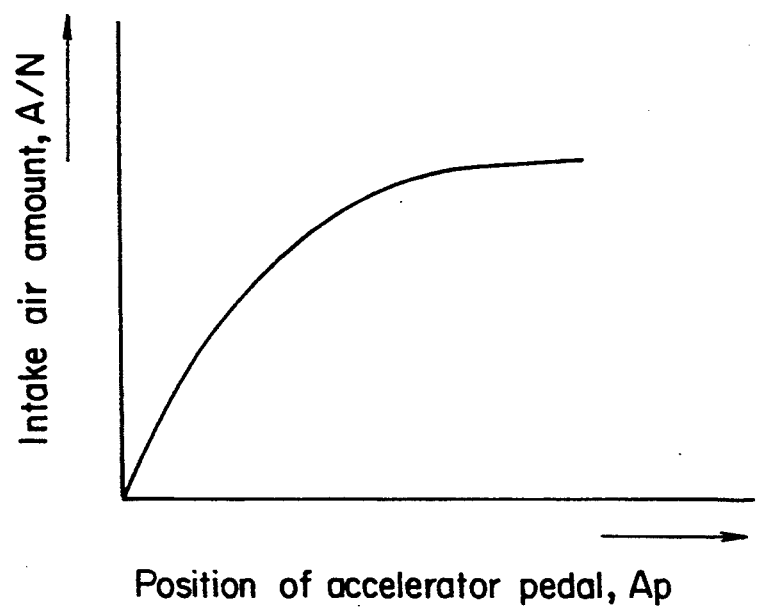

The target intake-air-amount calculating unit 32B stores therein, as a function, data which is shown in FIG. 9 as conditions for determining the intake air amount corresponding to the position Ap of the accelerator pedal. In addition, the target intake-air-amount calculating unit 32B calculates the first target intake air amount A/Nt$_1$ from the stored function and the depressed position Ap detected by the accelerator pedal position sensor 31.

The traction control unit 40B comprises a differentiator 41 for determining the acceleration of the vehicle body from the speed Vf of the follower wheels, a reference drive shaft torque calculating unit 42 for calculating a transmittable-to-road reference drive shaft torque Two from the acceleration of the vehicle body determined by the differentiator 41 and the body weight W and wheel diameter R which have been stored therein as data in advance, a reference engine output torque calculating unit 43 for calculating a reference engine output torque Teo from the reference drive shaft torque Two calculated by the reference drive shaft torque calculating unit 42, a reference intake-air-amount calculating unit 44 for obtaining a reference amount of intake air A/Nt based on the reference engine output torque Teo calculated by the reference engine output torque calculating unit 43, a subtracting unit 46 for subtracting the speed Vf of the follower wheels from the speed Vr of the drive wheels to determine the amount of slip DV (=Vr−Vf), a PID adjuster 47B for calculating a feedback operation amount ΔA/N (the amount of intake air) from the amount of slip DV obtained by the subtracting unit 46, and an adding unit 48B for adding the operation amount ΔA/N obtained by the PID adjuster 47B as a correction value to the reference intake air amount A/No. At the traction control unit 40B, the second target intake air amount A/Nt$_2$ is obtained based on the reference intake air amount A/No and the feedback of the amount of slip DV.

Incidentally, the reference engine output torque calculating unit 43 and the reference intake-air-amount calculating unit 44 are constructed as described above.

The auto-cruise control unit 50B comprises a target vehicle speed determining unit 51 for determining the speed Vf of the follower wheels as a target vehicle speed Vt at the time that the auto-cruise mode is established by the auto-cruise switch 60, a subtracting unit 52 for subtracting the speed Vf of the follower wheels from the target vehicle speed Vt determined by the target vehicle speed determining unit 51 to determine the speed deviation ΔV therebetween, a PID adjuster 53B for calculating the amount of operation of feedback ΔA/N (the amount of intake air) from the speed deviation ΔV obtained by the subtracting unit 52, and an adding unit 54B for adding the feedback operation amount ΔA/N obtained by the PID adjuster 53B as a correction value to the amount of intake air A/Nr from the ECI 16. The auto-cruise control unit 50B also determines a third target intake air amount A/Nt$_3$ based on the amount of intake air A/Nr and the feedback of the speed deviation ΔV.

The main control unit 70B comprises an intake-air-amount selecting unit 73B as a target-amount-of-control selecting means for selectively outputting one of the target intake-air amounts A/Nt$_1$, A/Nt$_2$ and A/Nt$_3$, which have been delivered from the control units 30B, 40B, 50B, respectively, according to a command of a selection control unit 72A which will be described later, an intake-air-amount comparing unit 71B for making a comparison among the values of the target intake air amounts A/Nt$_1$, A/Nt$_2$ and A/Nt$_3$, and a selection control unit 72B for controlling the selecting operation by the selecting unit 73B according to the comparison result from the comparing unit 71B and the operation mode based on the operation of the auto-cruise switch 60 and the value of the slip amount DV from the traction control unit 40B, and a target-degree-of-opening-of-throttle calculating unit 74 as an amount-of-control-of-engine-output setting means for calculating the target opening degree $\theta_t$ of throttle based on the target intake air amount A/Nt selected by the intake-air-amount selecting unit 73B, the engine speed Ne and the intake air amount A/Nr.

In this case, the target-degree-of-opening-of-throttle calculating circuit 74 calculates the target opening degree $\theta_t$ of the throttle corresponding to the target intake air amount A/Nt based on the relation shown in FIG. 5 (see the drawing employed in the first embodiment) between the amount of intake air A/N and the opening degree $\theta$ of the throttle in the case where the engine speed Ne is set as a parameter. In addition, in the target-degree-of-opening-of-throttle calculating circuit 74, the intake air amount A/Nr is fed back as a correction value upon calculation of the degree of opening of throttle in order to correct the deviation of the intake air amount, which is caused by an error of the position of the throttle valve.

Figure 10:
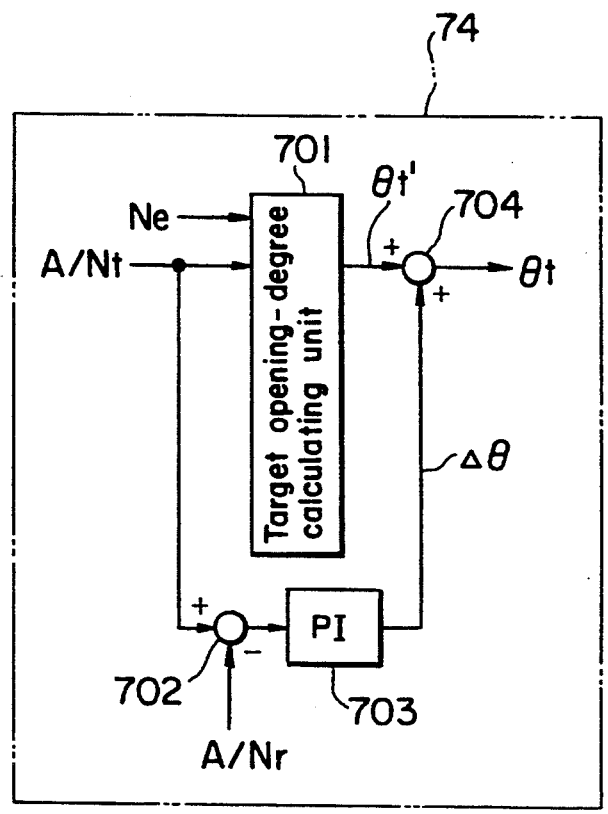

The target-degree-of-opening-of-throttle calculating circuit 74 is composed of a target-degree-of-opening-of-throttle calculating unit 701, a subtracting unit 702, a PI adjuster 703 and an adding unit 704 as shown in FIG. 10 by way of example.

The target-degree-of-opening-of-throttle calculating unit 701 is adapted to calculate a target opening degree $\theta_t$, from the target intake air amount A/Nt and the engine speed Ne. The subtracting unit 702 is used to calculate the deviation, i.e., the difference between the target intake air amount A/Nt and the intake air amount A/Nr, and the PI adjuster 703 is adapted to obtain the amount of feedback operation Δθ (the amount of the opening degree of throttle) based on the deviation calculated by the subtracting unit 702. In addition, the adding unit 704 adds the amount of feedback operation Δθ to the target opening degree $\theta_t$, of the throttle delivered from the target-degree-of-opening-of-throttle calculating unit 701 to thereby obtain a final target opening degree $\theta_t$.

The engine output control apparatus according to the second embodiment of this invention is constructed as described above.

Figure 11:
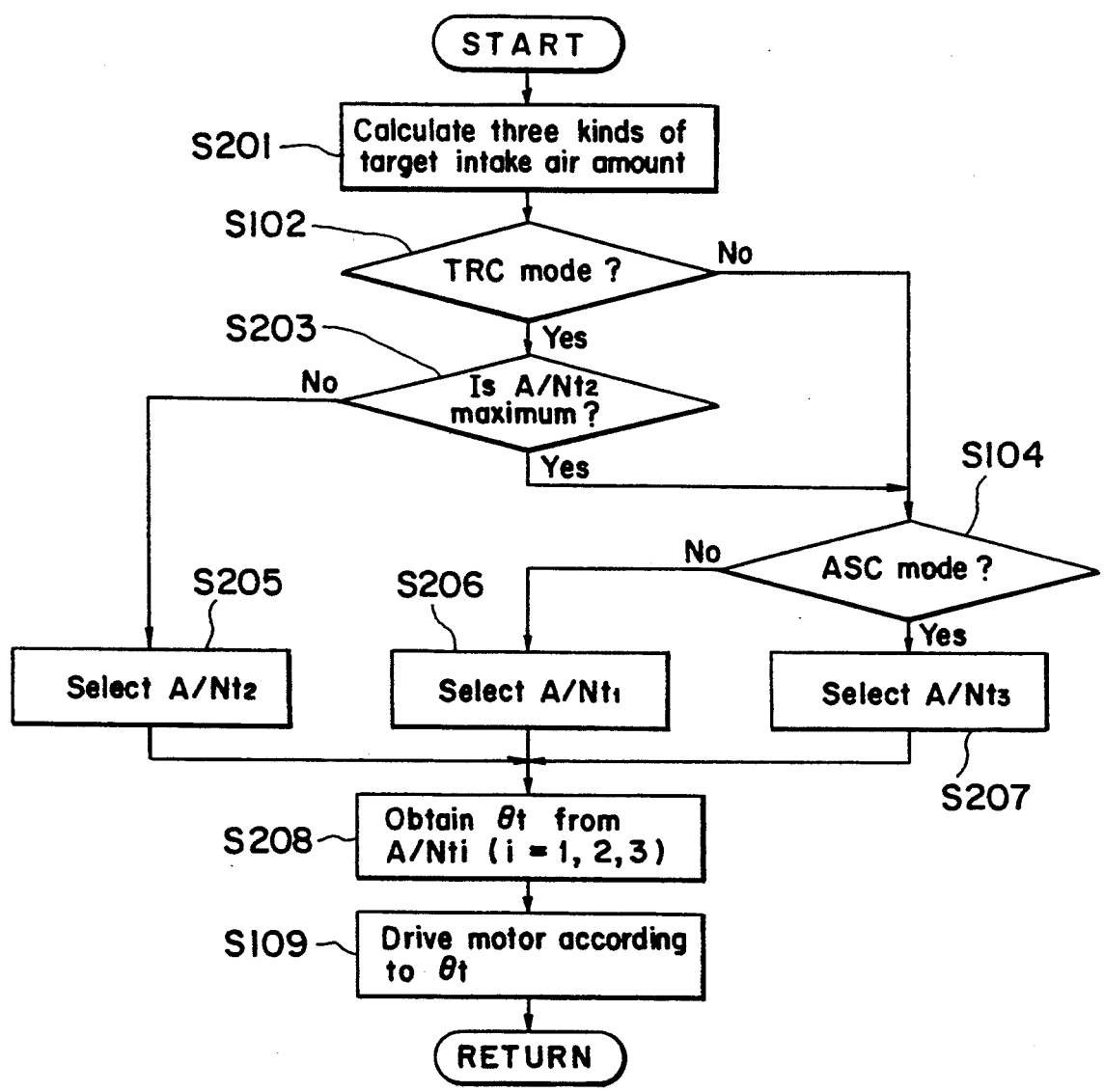

A description will next be made of the operation of the apparatus with reference to FIG. 11.

The first, second and third target intake air amounts are first calculated in Step 201.

More specifically, when the accelerator pedal 20 is depressed, the accelerator pedal position sensor 31 in the throttle-by-wire control unit 30B detects the depressed position Ap of the accelerator pedal 20 and the first target intake air amount A/Nt$_1$ is obtained commensurate with the depressed position Ap from the throttle-by-wire control unit 30B.

The traction control unit 40B determines the slip amount DV as the difference between the speed Vr of the drive wheels and the speed Vf of the follower wheels and also obtains the second target air amount A/Nt$_2$ which allows the slip to cease.

Described more specifically, the differentiator 41 serves to determine the acceleration of the vehicle body from the speed Vf of the follower wheels, and the reference drive shaft torque calculating unit 42 calculates a transmittable-to-road reference drive shaft torque Two from the acceleration of the vehicle body and the body weight W and wheel diameter R which have been stored as data in advance. Further, the reference engine output torque calculating unit 43 calculates the reference engine output torque Teo required to obtain the reference drive shaft torque Two thus calculated by considering the gear ratio $\rho$ of the transmission 13 and the torque ratio $\tau$ of the torque converter 11. Then, the reference intake-air-amount calculating unit 44 calculates the reference intake-air-amount A/No necessary to obtain the reference engine output torque Two.

At the same time, the subtracting unit 46 subtracts the speed Vf of the follower wheels from the speed Vr of the drive wheels to determine the amount of slip DV (=Vr−Vf), and the PID adjuster 47B determines the operation amount ΔA/N (the amount of intake air) of feedback from the slip amount DV.

Then, the adding unit 48A adds the thus obtained operation amount $\Delta A/N$ to the reference opening degree $A/Nto$ of throttle as the correction value to determine the second target air amount $A/Nt_2$.

On the other hand, the auto-cruise control unit 50B monitors the state of the auto-cruise switch 60. When the auto-cruise switch 60 is operated to establish the auto-cruise mode, the target vehicle speed determining unit 51 determines the speed Vf of the follower wheels as the target vehicle speed Vt. Further, the subtracting unit 52 subtracts the speed Vf thereof from the target vehicle speed Vt thus determined to thereby obtain the speed deviation $\Delta V$. Then, the PID adjuster 53B obtains the operation amount $\Delta A/N$ of feedback from the speed deviation $\Delta V$. Next, the adding unit 54B adds the operation amount $\Delta A/N$ thus obtained, as the correction value, to the actual intake air amount $A/Nr$ to determine the third target air amount $A/Nt_3$.

Incidentally, when the auto-cruise switch 60 is operated again to release the auto-cruise mode or when a brake pedal or accelerator pedal 20 of the vehicle is depressed, the auto-cruise control unit 50B detects whether or not the auto-cruise mode has been released or detects the state of depressing operation of the brake pedal or accelerator pedal 20 to thereby terminate the determination of the target vehicle speed Vt.

Then, each of the aforementioned target air amounts $A/Nt_1$, $A/Nt_2$ and $A/Nt_3$ is inputted to the main control unit 70B.

The main control unit 70B selects one of the aforementioned target air amounts $A/Nt_1$, $A/Nt_2$ and $A/Nt_3$ according to the operation mode.

In other words, it is first judged in Step 102 whether or not the operation mode is the TRC mode (traction mode). Incidentally, in the same manner as described above, the TRC mode is set when the slip amount DV from the traction control unit 40B exceeds the predetermined value, whereas it is not set when the slip amount DV does not exceed the predetermined value.

If the TRC mode has not been established, the routine procedure proceeds to Step 104, while if it has been established, the routine procedure proceeds to Step 103. In Step 103, the degree-of-opening-of-throttle comparing unit 71B effect a mutual comparison among the values of the target air amounts $A/Nt_1$, $A/Nt_2$ and $A/Nt_3$ from the control units 30B, 40B and 50B and makes a judgment as to whether or not the value of the second target air amount $A/Nt_2$ associated with the TRC mode the maximum.

If the value of $A/Nt_2$ is the maximum, the routine procedure advances to Step 104. If it is not, the routine procedure proceeds to Step 205 where the second target air amount $A/Nt_2$ is selected as the target intake air amount. Namely, if the condition that the value of the second target air amount $A/Nt_2$ is smaller than any of the values of the remaining target air amounts $A/Nt_1$ and $A/Nt_2$ is met, the second target air amount $A/Nt_2$ is chosen.

In a manner similar to the aforementioned first embodiment, when the slip amount DV exceeds the predetermined value, the traction mode is set. As traction control at this time, it is necessary to set the second target air amount $A/Nt_2$ such that the opening degree $\theta$ of throttle becomes smaller than the current opening degree and the slip is allowed to cease. However, when the value of the second target air amount $A/Nt_2$ is larger than that of each of the remaining target air amounts $A/Nt_1$ and $A/Nt_3$, the use of either the target air amount $A/Nt_1$ or $A/Nt_3$ rather than that of the second target air amount $A/Nt_2$ is better fitted, from the standpoint of traction control for the purpose of control that the slip be ceased. To this end, the condition that "the value of the second target air amount $A/Nt_2$ is not the maximum" is employed as a condition for the second target air amount $A/Nt_2$ which can cease the slip.

On the other hand, when the routine procedure advances to Step 104, it is judged whether or not the auto-cruise mode (ASC mode) has been established by the auto-cruise switch 60.

When it is judged to be positive, the routine procedure proceeds to Step 207 where the third target air amount $A/Nt_3$ is selected as the target intake air amount.

When it is judged to be negative, the routine procedure advances to Step 206 where the first target air amount $A/Nt_1$ is chosen as the target air amount.

In this case, the ASC mode is set by the operation of the auto-cruise switch 60. However, when a command to release the auto-cruise mode is made by reoperation of the auto-cruise switch 60 or when the depression of the brake pedal or accelerator pedal 20 equivalent to the release command of the auto-cruise mode is effected, during running of the vehicle at a constant speed under the ASC mode, the auto-cruise mode is released and the selection of the third target air amount $A/Nt_3$ is also released, thereby finishing the running at the constant speed.

As described above, the selecting operation of one ($A/Nt_i$, where $i=1, 2, 3$) of the target air amounts $A/Nt_1$, $A/Nt_2$ and $A/Nt_3$ is effected by the intake-air-amount selecting unit 73B which is actuated by the control of the selection control unit 72B.

Then, the routine procedure advances to Step 208. The target degree-of-opening-of-throttle calculating unit 74 calculates a target opening degree $\theta_t$ of throttle from the selected target air amount $A/Nt$.

Subsequently, in Step 109, the step motor 7 is driven according to the target opening degree $\theta_t$ of throttle so that an adjustment is made to bring the opening degree $\theta$ of the throttle valve 6 into conformity with the target opening degree $\theta_t$ of throttle.

As described above, the main control unit 70B selects the first target air amount $A/Nt_1$ from the throttle-by-wire control unit 30B when the condition that the operation is in neither the traction mode nor the auto-cruise mode is met. The main control unit 70B selects the third target air amount $A/Nt_3$ from the auto-cruise control unit 50B when the condition that the operation is not in the traction mode but is in the auto-cruise mode is met. The main control unit 70B selects the second target air amount $A/Nt_2$ when the condition that the traction mode is established and the value of the second target air amount $A/Nt_2$ from the traction control unit 40B is not the maximum is met. However, the selection of either the first target air amount $A/Nt_1$ or the third target air amount $A/Nt_3$ is made according to whether or not the operation mode is an auto-cruise mode if the value of the second target air amount $A/Nt_2$ is the maximum even in the traction mode.

As a result, when the first target air amount $A/Nt_1$ is selected, a drive shaft torque corresponding to the depressed position Ap of the accelerator pedal 20 is transmitted to the drive shaft 14 so that the so-called throttle-by-wire control of such a type that the drive shaft torque serves as drive force at the wheels 15 is performed. Then, when the third target air amount $A/Nt_3$ is selected, a drive shaft torque required to permit running of the vehicle at the constant speed is transmitted to the drive shaft 14 so that the so-called auto-cruise control of such a type that the vehicle runs at the constant speed of the target vehicle speed Vt is performed. Further, when the second target air amount $A/Nt_2$ is chosen, a drive shaft torque which can cease the slip is transmitted to the drive shaft 14 so that the so-called traction control of such a type that the slip of the wheels ceases is performed.

As described above, the target air amounts $A/Nt_1$, $A/Nt_2$ and $A/Nt_3$, namely, the same kind of parameters are used as control parameters (target amounts of control) in the throttle-by-wire control, the traction control and the auto-cruise control, respectively and one of the target air amounts $A/Nt_1$, $A/Nt_2$ and $A/Nt_3$ is selected according to their respective magnitudes and the operation mode of the vehicle. Thus, similarly to the first embodiment, the function of each control can be fully exhibited without complication of the opening degree control for the throttle valve 6. An improvement in safety or the like can hence be achieved owing to the traction control. In addition, the means for determining the degree of opening of the throttle can also be used for the respective controls.

Accordingly, the throttle-by-wire control, the traction control and the auto-cruise control can all be performed by a single drive-by-wire system unit without dimensional enlargement of the apparatus.

An engine output control apparatus according to a third embodiment of this invention will next be described with reference to FIGS. 12 through 15.

Figure 12:
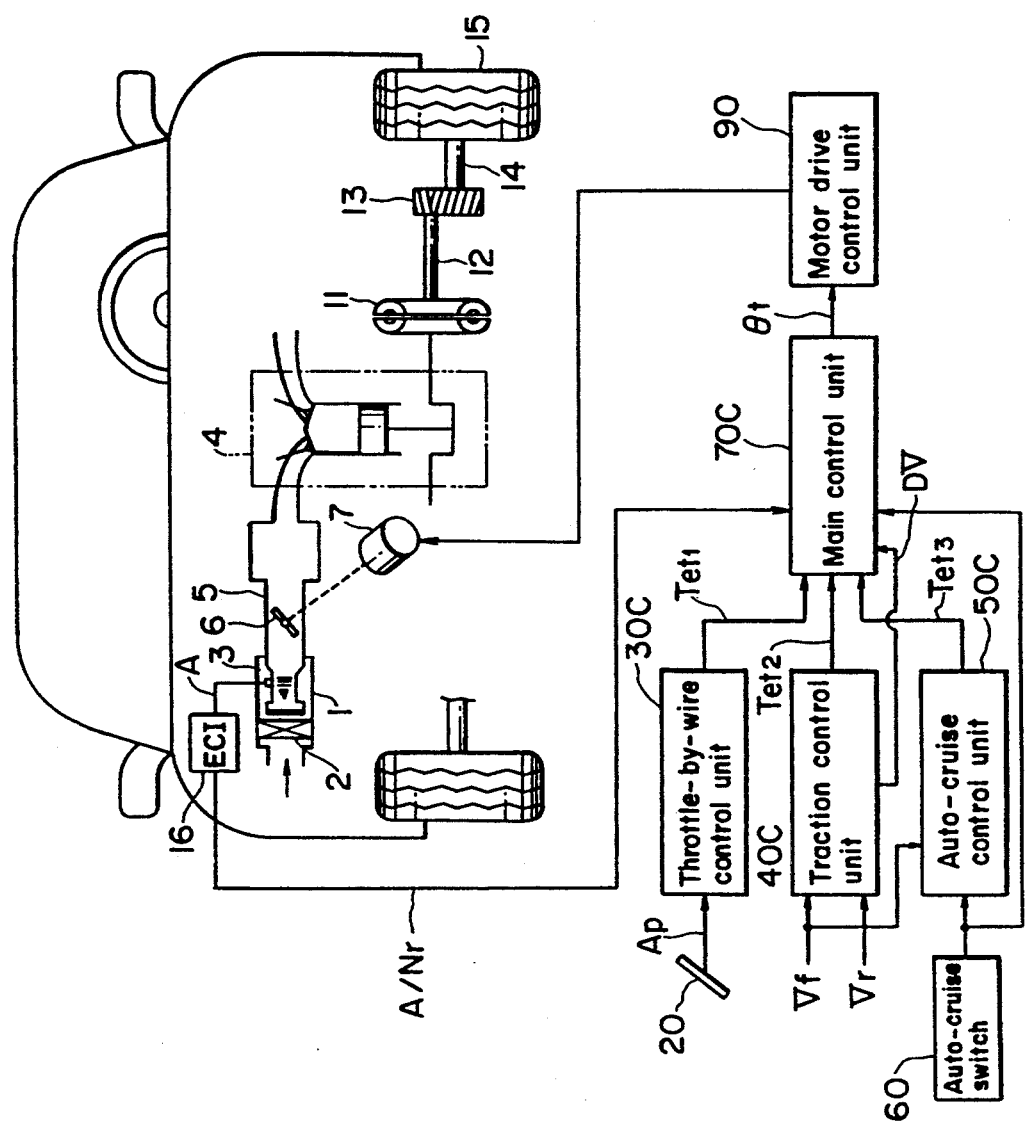

FIG. 12 is a schematic block diagram showing the construction of a vehicle equipped with the engine output control apparatus. In FIG. 12, 1 and 7, like reference numerals designate like elements of structure and their description will be omitted in part.

The opening degree $\theta$ of the throttle valve 6 also serves as a direct parameter for controlling the engine output, i.e., the amount of control of the engine output in the present embodiment.. In addition, the amount of intake air A is delivered to the ECI 16 where an intake air amount per engine revolution $A/Nr$ is calculated every predetermined crank angle and delivered to desired units to be described later, such as a main control unit 70C or the like.

Further, a throttle-by-wire (TBW) control unit 30C, a traction (TRC) control unit 40C, an auto-cruise (ASC) control unit 50C and the main control unit 70C employed in the present embodiment are different from their corresponding units in the first and second embodiments.

Similarly to the preceding embodiments, the throttle-by-wire control unit 30C is adapted to set the control amount for throttle-by-wire control. It corresponds to the first target-amount-of-control setting means. In addition, the throttle-by-wire control unit 30C detects the depressed position Ap of the accelerator pedal 20 as the amount of depressing operation of the accelerator pedal 20 to determine a first target engine output torque $Tet_1$ as the first target control amount corresponding to the position Ap thus detected.

As described above, designated at numeral 40C is a traction control unit, which is adapted to set a control amount for traction control. The traction control unit 40C corresponds to the second target-amount-of-control setting means and detects a slip of at least one wheel (drive wheel) based on the speed Vf of follower wheels and the speed Vr of the drive wheels, each detected by an unillustrated sensor, so as to determine a second target engine output torque $Tet_2$ as the second target control amount which can cease the slip.

Designated at numeral 50C is an auto-cruise control unit, which is adapted to set a control amount for auto-cruise control. The auto-cruise control unit 50C corresponds to the third target-amount-of-control setting means and determines a third target engine output torque $Tet_3$ as the third target control amount required to make constant the vehicle speed, i.e., to permit running of the vehicle at the constant speed when the auto-cruise mode (ASC mode) is established by an auto-cruise switch 60.

Each of the target engine output torques $Tet_1$, $Tet_2$, $Tet_3$ determined or calculated by the control units 30C, 40C, 50C, respectively, is delivered to a main control unit 70C.

The main control unit 70C has the function of selecting one of the target engine output torques $Tet_1$, $Tet_2$ and $Tet_3$ according to at least one operation mode for thereby establishing a target opening degree $\theta_t$ of throttle based on the target engine output torque $Tet$ thus selected.

Incidentally, operation modes may include an auto-cruise mode to be set by the auto-cruise switch 60 and a traction mode (TRC mode) to be set when the amount of slip DV determined by the traction control unit 40C exceeds a predetermined value.

The target opening degree $\theta_t$ of throttle established by the main control unit 70C is transmitted to a motor drive control unit 90 as a control-amount signal.

The motor drive control unit 90 is constructed in the same manner as described above.

Figure 13:
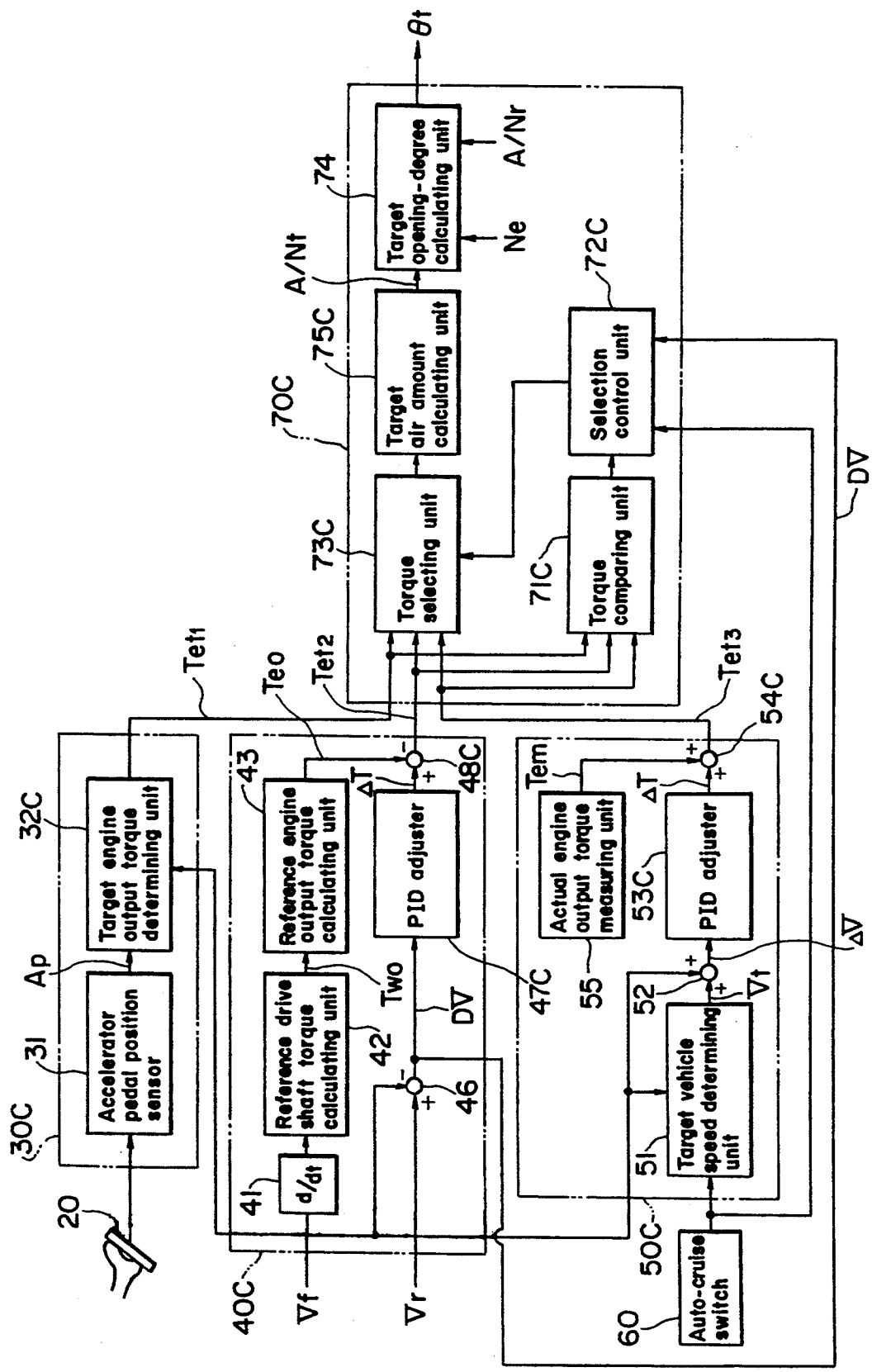

A description will next be made of the structure embodying the throttle-by-wire control unit 30C through the motor drive control unit 90 with reference to FIG. 13.

First, the throttle-by-wire control unit 30C is composed of an accelerator pedal position sensor 31 and a target engine output torque determining unit 32C.

The accelerator pedal position sensor 31 has the same structure as described above.

Figure 14:
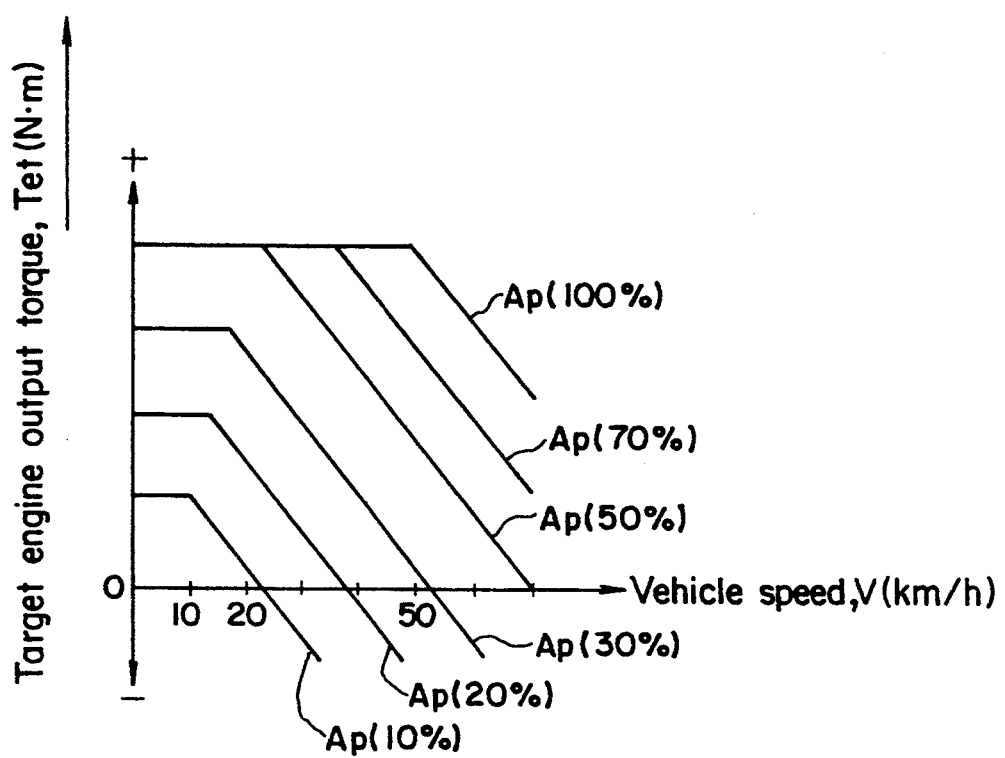

The target engine output torque determining unit 32C is adapted to determine the target engine output torque $Tet_1$ as conditions for determining the amount of intake air according to the depressed position Ap of the accelerator pedal 20 and the vehicle speed V (the speed Vf of the follower wheels) as parameters. When the vehicle speed V is in a lower-speed range by way of example, the target engine output torque determining unit 32C determines a value corresponding exactly to the depressed position Ap of the accelerator pedal 20 irrespective of the vehicle speed V in view of the feeling of acceleration at the time of a start. On the other hand, when the vehicle speed V exceeds a predetermined value, the target engine output torque determining unit 32C determines a value which decreases with an increase of the vehicle speed V in view of the stability of speed (the maintenance of speed). Incidentally, FIG. 14 shows one example of conditions for determining the target engine output torque $Tet_1$ as described above.

The traction control unit 40C comprises a differentiator 41 for determining the acceleration of the vehicle body from the speed Vf of the follower wheels, a reference drive shaft torque calculating unit 42 for calculating a transmittable-to-road reference drive shaft torque Two from the acceleration of the vehicle body determined by the differentiator 41 and the body weight W and wheel diameter R which have been stored as data in advance, a reference engine output torque calculating unit 43 for calculating a reference engine output torque Teo from the reference drive shaft torque Two calculated by the reference drive shaft torque calculating unit 42, a subtracting unit 46 for subtracting the speed Vf of the follower wheels from the speed Vr of the drive wheels to determine the amount of slip DV (= Vr−Vf), a PID adjuster 47C for calculating the amount of feedback operation ΔT (the amount of torque) from the amount of slip DV obtained by the subtracting unit 46, and an adding unit 48C for adding the operation amount ΔT obtained by the PID adjuster 47C as a correction value to the reference engine output torque Teo. At the traction control unit 40C, the second target engine output torque Tet$_2$ is obtained based on the reference engine output torque Teo and the feedback of the amount of slip DV.

Incidentally, the reference engine output torque calculating unit 43 is constructed as described above.

The auto-cruise control unit 50C comprises an actual engine output torque measuring unit 55 for measuring an actual engine output torque Tem actually produced from the engine body 4, a target vehicle speed determining unit 51 for determining the speed Vf of the follower wheels as a target vehicle speed Vt at the time that the auto-cruise mode is established by the auto-cruise switch 60, a subtracting unit 52 for subtracting the speed Vf of the follower wheels from the target vehicle speed Vt determined by the target vehicle speed determining unit 51 to determine the speed deviation ΔV therebetween, a PID adjuster 53C for calculating the amount of feedback operation ΔT (the amount of torque) from the speed deviation ΔV obtained by the subtracting unit 52, and an adding unit 54B for adding the feedback operation amount ΔT obtained by the PID adjuster 53C as a correction value to the actual engine output torque Tem from the actual engine output torque measuring unit 55. The auto-cruise control unit 50C also determines a third target engine output torque Tet$_3$ based on the actual engine output torque Tem and the feedback of the speed deviation ΔV.

The main control unit 70C comprises a target engine output torque selecting unit (a torque selecting unit) 73C as a target-amount-of-control selecting means for selectively outputting one of the target engine output torques Tet$_1$, Tet$_2$ and Tet$_3$, which have been delivered from the control units 30C, 40C, 50C, respectively, according to a command of a selection control unit 72C to be described later, a target drive shaft torque comparing unit (a torque comparing unit) 71C for making a comparison among the values of the target engine output torques Tet$_1$, Tet$_2$ and Tet$_3$, the selection control unit 72C for controlling the selecting operation by the selecting unit 73C according to the comparison result from the comparing unit 71C and the operation mode based on the operation of the auto-cruise switch 60 and the value of the slip amount DV from the traction control unit 40C, a target-amount-of-intake-air calculating unit 75C for calculating the target intake air amount A/Nt from the target engine output torque Tet selected by the selecting unit 73C, and a target-degree-of-opening-of-throttle calculating unit 74 as an amount-of-control-of-engine-output setting means for calculating the target opening degree θ$_t$ of throttle based on the target intake air amount A/Nt selected by the target-amount-of-intake-air calculating unit 75C, the engine speed Ne and the intake air amount A/Nr.

Incidentally, the aforementioned target-amount-of-intake-air calculating unit 75C stores, as a map, the relation shown in FIG. 4 (see the drawing in the first embodiment) between the amount of intake air A/N and the engine output torque Te and determines the target intake air amount A/Nt corresponding to the target engine output torque Tet based on the map. In addition, the relation shown in FIG. 4 is stored as a numerical expression in the target-amount-of-intake-air calculating unit 75C and the target intake air amount A/Nt may be calculated by means of this numerical expression.

In this case, the target-degree-of-opening-of-throttle calculating unit 74 is structurally identical to that employed in the second embodiment (see FIG. 10).

The engine output control apparatus according to the third embodiment of this invention is constructed as described above.

Figure 15:
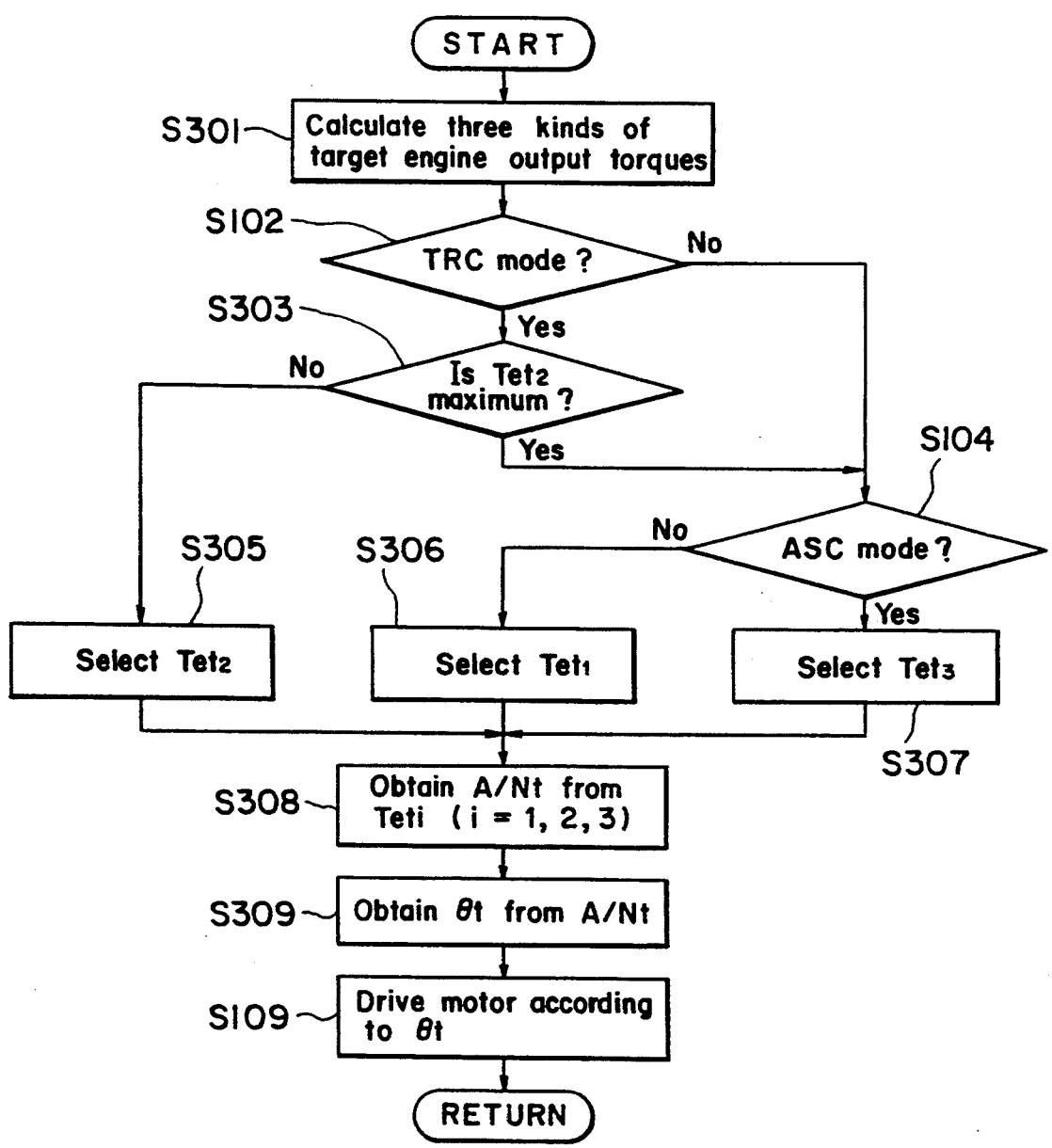

A description will next be made of the operation of the apparatus with reference to FIG. 15.

The first, second and third target engine output torques are first calculated in Step 301.

Described specifically, when the accelerator pedal 20 is depressed, the accelerator pedal position sensor 31 in the throttle-by-wire control unit 30C detects the depressed position Ap of the accelerator pedal 20.

When the vehicle speed V is in a lower-speed range (below a predetermined value) at this time, the target engine output torque determining unit 32C determines the first target engine output torque Tet$_1$ corresponding exactly to the depressed position Ap of the accelerator pedal 20 irrespective of the vehicle speed V in view of the feeling of acceleration at the time of a start. On the other hand, when the vehicle speed V is in a higher-speed range (above the predetermined value), the target engine output torque determining unit 32C determines a first target engine output torque Tet$_1$ which decreases with an increase of the vehicle speed V in view of the stability of speed (the maintenance of speed).

The traction control unit 40C determines the slip amount DV as the difference between the speed Vr of the drive wheels and the speed Vf of the follower wheels and also obtains a second target engine output torque Tet$_2$ which can cease the slip.

Described more specifically, the differentiator 41 serves to obtain the acceleration of the vehicle body from the speed Vf of the follower wheels, and the reference drive shaft torque calculating unit 42 calculates a transmittable-to-road reference drive shaft torque Two from the acceleration of the vehicle body and the body weight W and wheel diameter R which have been stored as data in advance. Further, the reference engine output torque calculating unit 43 calculates the reference engine output torque Teo required to obtain the reference drive shaft torque Two thus calculated by considering the gear ratio ρ of the transmission 13 and the torque ratio τ of the torque converter 11.

At the same time, the subtracting unit 46 subtracts the speed Vf of the follower wheels from the speed Vr of the drive wheels to determine the amount of slip DV (=Vr−Vf), and the PID adjuster 47C determines the operation amount ΔT (the amount of torque) of feedback from the slip amount DV.

Then, the adding unit 48C adds the thus obtained operation amount ΔT to the reference opening degree Tet$_0$ of throttle as a correction value to determine the second target engine output torque Tet$_2$.

On the other hand, the actual engine output torque measuring unit 55 in the auto-cruise control unit 50C measures the actual engine output torque actually produced by the engine body 4 and at the same time, monitors the state of the auto-cruise switch 60. When the auto-cruise switch 60 is operated to establish the auto-cruise mode, the target vehicle speed determining unit 51 determines the speed Vf of the follower wheels as the target vehicle speed Vt.

Further, the subtracting unit 52 subtracts the speed Vf thereof from the target vehicle speed Vt thus determined to thereby obtain the speed deviation $\Delta V$. Then, the PID adjuster 53C obtains the operation amount $\Delta T$ of feedback from the speed deviation $\Delta V$. Next, the adding unit 54C adds the operation amount $\Delta T$ thus obtained, as a correction value, to an actual drive shaft torque Twn to thereby determine the third target engine output torque Tet$_3$.

Incidentally, when the auto-cruise switch 60 is operated again to release the auto-cruise mode or when a brake pedal or accelerator pedal 20 of the vehicle is depressed, the auto-cruise control unit 50C detects whether or not the auto-cruise mode has been released or detects the state of depressing operation of the brake pedal or accelerator pedal to thereby terminate the determination of the target vehicle speed Vt.

Then, each of the aforementioned target engine output torques Tet$_1$, Tet$_2$ and Tet$_3$ is inputted to the main control unit 70C.

The main control unit 70C selects one of the aforementioned target engine output torques Tet$_1$, Tet$_2$ and Tet$_3$ according to the operation mode.

Namely, it is discriminated in Step 102 whether or not the operation mode is the traction mode (TRC mode). Incidentally, as in the preceding embodiments, the TRC mode is set when the slip amount DV from the traction control unit 40C exceeds a predetermined value, but it is not set when the slip amount DV does not exceed the predetermined value.

Unless TRC mode has been established, the routine procedure proceeds to Step 104, but if it has not been established, the routine procedure proceeds to Step 403 in Step 403, the degree-of-opening-of-throttle comparing unit 71C performs a comparison among the values of the target engine output torques Tet$_1$, Tet$_2$ and Tet$_3$ from the control units 30C, 40C and 50C and makes a judgment as to whether or not the value of the second target engine output torque Tet$_2$ associated with the TRC mode is the maximum.

If the value of Tet$_2$ is the maximum, the routine procedure advances to Step 104. If it is not, the routine procedure proceeds to Step 405 where the second target engine output torque Tet$_2$ is selected as the target engine output torque. Namely, if the condition that the value of the second target engine output torque Tet$_2$ is smaller than any value of the remaining target engine output torques Tet$_1$ and Tet$_3$ is met, the second target engine output torque Tet$_2$ is chosen.

In a manner similar to the aforementioned first and second embodiments, when the slip amount DV exceeds the predetermined value, the traction mode is established, at which time the traction control makes it necessary to set the second target engine output torque Tet$_2$ such that the opening degree $\theta$ of throttle becomes smaller than the current opening degree thereby allowing the slip to cease. However, when the value of the second target engine output torque Tet$_2$ is greater than that of each of the remaining target engine output torques Tet$_1$ and Tet$_3$, the use of either the target engine output torque Tet$_1$ or Tet$_3$ rather than that of the second target engine output torque Tet$_2$ is better fitted from the standpoint of the traction control for the purpose of control that the slip be ceased. To this end, the condition that "the value of the second target engine output torque Tet$_2$ is not the maximum" is employed as a condition for the second target engine output torque Tet$_2$ which can cease the slip.

On the other hand, when the routine procedure advances to Step 104, it is discriminated whether or not the auto-cruise mode (ASC mode) has been established by the auto-cruise switch 60.

When it is discriminated to be positive, the routine procedure proceeds to Step 407 where the third target engine output torque Tet$_3$ is chosen as the target engine output torque.

When it is discriminated to be negative, the routine procedure advances to Step 306 where the first target engine output torque Tet$_1$ is selected as the target engine output torque.

In this case, the ASC mode is set by the operation of the auto-cruise switch 60. However, when a command to release the auto-cruise mode is made by reoperation of the auto-cruise switch 60 or when the depression of the brake pedal or accelerator pedal 20 equivalent to the release command of the auto-cruise mode is effected, during running of the vehicle at a constant speed under the ASC mode, the auto-cruise mode is released and selection of the third target engine output torque Tet$_3$ is also released, thereby finishing the running at the constant speed.

As described above, the selecting operation of one (Tet$_i$, where i=1, 2, 3) of the target engine output torques Tet$_1$, Tet$_2$ and Tet$_3$ is effected by the selecting unit 73C which is actuated by the control of the selection control unit 72C.

Then, the routine procedure advances to Step 308 where the target-amount-of-intake-air calculating unit 75C determines the target intake air amount A/Nt required to obtain the target engine output torque Tet.

The routine procedure further proceeds to Step 309 where the target degree-of-opening-of-throttle calculating unit 74 calculates the target opening degree $\theta_t$ of throttle from the calculated target intake air amount A/Nt.

Subsequently, in Step 109, the step motor 7 is driven according to the target opening degree $\theta_t$ of throttle so that an adjustment is made to bring the opening degree $\theta$ of the throttle valve 6 into conforming with the target opening degree $\theta_t$ of throttle.

As described above, the main control unit 70C selects the first target engine output torque Tet$_1$ from the throttle-by-wire control unit 30C when the condition that the operation is in neither the traction mode nor the auto-cruise mode is met. The main control unit 70C selects the third target engine output torque Tet$_3$ from the auto-cruise control unit 50C when the condition that the operation is not in the traction mode but is in the auto-cruise mode is met. Further, the main control unit 70C selects the second target engine output torque Tet$_2$ when the condition that the traction mode is established and the value of the second target engine output torque Tet$_2$ from the traction control unit 40C is not the maximum is met. However, the selection of either the first target engine output torque Tet$_1$ or the third target engine output torque $Tet_3$ is effected according to whether or not the operation mode is the auto-cruise mode if the value of the second target engine output torque $Tet_2$ is the maximum even in the traction mode.

As a result, when the first target engine output torque $Tet_1$ is selected, a drive shaft torque corresponding to the depressed position Ap of the accelerator pedal 20 is transmitted to the drive shaft 14 so that the so-called throttle-by-wire control of such a type that the drive shaft torque serves as drive force at the wheels 15 is performed. Then, when the third target engine output torque $Tet_3$ is chosen, a drive shaft torque required to permit running of the vehicle at the constant speed is transmitted to the drive shaft 14 so that the so-called auto-cruise control of such a type that the vehicle runs at the constant speed of the target vehicle speed Vt is made. Further, when the second target engine output torque $Tet_2$ is chosen, a drive shaft torque which can cease the slip is transmitted to the drive shaft 14 so that the so-called traction control of such a type that the slip of the wheels ceases is performed.

As described above, the target engine output torques $Tet_1$, $Tet_2$ and $Tet_3$, namely, the same kind of parameters are used as control parameters (target amounts of control) in the throttle-by-wire control, the traction control and the auto-cruise control, respectively and one of the target engine output torques $Tet_1$, $Tet_2$ and $Tet_3$ is selected according to their respective magnitudes and the operation mode of the vehicle. Thus, in the same manner as in the first and second embodiments, the function of each control can be fully exhibited without complication of the opening-degree control of the throttle valve 6. An improvement in safety or the like can be achieved owing to the traction control. In addition, the means for determining the opening degree $\theta$ of the throttle from the target engine output torque Tet can be commonly used for the respective controls.

Accordingly, this embodiment can also perform all the throttle-by-wire control, traction control and auto-cruise control by a single drive-by-wire system unit without dimensional enlargement of the apparatus.

An engine output control apparatus according to a fourth embodiment of this invention will next be described with reference to FIGS. 16 through 20.

Figure 16:
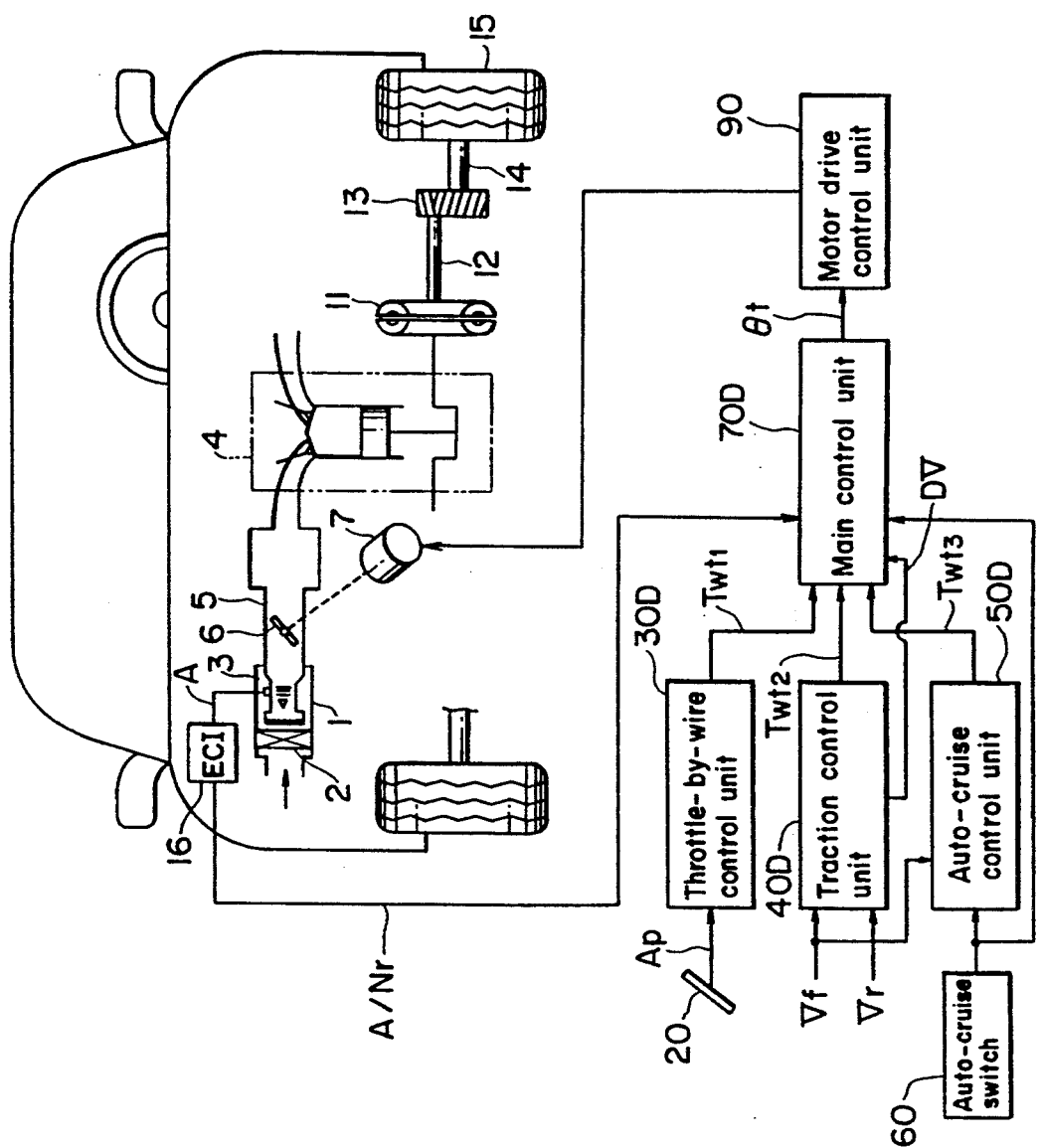

FIG. 16 is a schematic block diagram showing the construction of a vehicle equipped with the engine output control apparatus. In FIG. 16 1, 7 and 12, like reference numerals designate like elements of structure and their description will be omitted in part.

The opening degree $\theta$ of the throttle valve 6 also serves as a direct parameter for controlling the engine output, i.e., the amount of control of the engine output in the case of the present embodiment. In addition, the amount of intake air A is delivered to the ECI 16 where an intake air amount per engine revolution A/Nr is calculated every predetermined crank angle and delivered to desired units to be described later, such as a main control unit 70D or the like .

Further, a throttle-by-wire (TBW) control unit 30D, a traction (TRC) control unit 40D, an auto-cruise (ASC) control unit 50D and the main control unit 70D employed in the present embodiment are different from their corresponding units in the first, second and third embodiments.

Similarly to the preceding embodiments, the throttle-by-wire control unit 30D is adapted to set the control amount for throttle-by-wire control. It corresponds to the first target-amount-of-control setting means. In addition, the throttle-by-wire control unit 30D is adapted to detect the depressed position Ap of the accelerator pedal 20 as the amount of depressing operation of the accelerator pedal 20 to thereby determine a first target drive shaft torque $Twt_1$ as the first target control amount corresponding to the position Ap thus detected.

As described above, designated at numeral 40D is a traction control unit, which is adapted to set a control amount for traction control. The traction control unit 40D corresponds to the second target-amount-of-control setting means and detects of a slip of at least one wheel (drive wheel) based on the speed Vf of follower wheels and the speed Vr of the drive wheels, each detected by an unillustrated sensor, so as to determine a second target drive shaft torque $Twt_2$ as the second target control amount which can cease the slip.

Designated at numeral 50D is an auto-cruise control unit, which is adapted to set a control amount for auto-cruise control. The auto-cruise control unit 50D corresponds to the third target-amount-of-control setting means and determines a third target drive shaft torque $Twt_3$ as the third target control amount required to make constant the vehicle speed, i.e., to permit running of the vehicle at the constant speed when the auto-cruise mode (ASC mode) is established by the auto-cruise switch 60.

Each of the target drive shaft torques $Twt_1$, $Twt_2$ and $Twt_3$ determined or calculated by the control units 30D, 40D and 50D, respectively, is delivered to the main control unit 70D.

The main control unit 70D has the function of selecting one of the target drive shaft torques $Twt_1$, $Twt_2$ and $Twt_3$ according to at least one operation mode for thereby establishing a target opening degree $\theta_t$ of throttle based on the target drive shaft torque Twt thus selected.

Incidentally, operation modes may include an auto-cruise mode to be set by the auto-cruise switch 60 and a traction mode (TRC mode) to be set when the amount of slip DV determined by the traction control unit 40D exceeds a predetermined value.

The target opening degree $\theta_t$ of throttle established by the main control unit 70D is inputted to a motor drive control unit 90 as a control-amount signal.

The motor drive control unit 90 is constructed in the same manner as described above.

Figure 17:
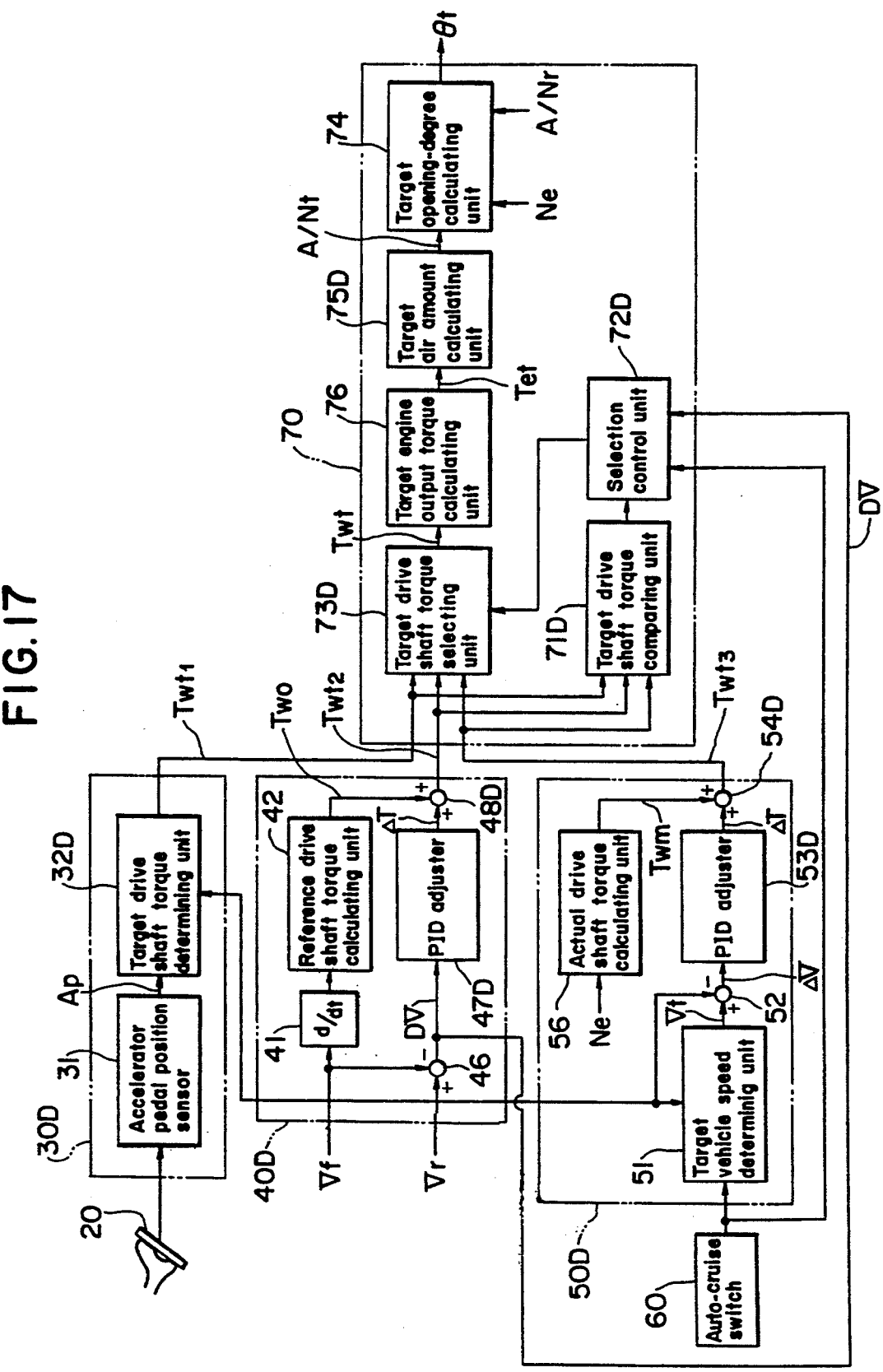

A description will next be made of the structure embodying the throttle-by-wire control unit 30D through the motor drive control unit 90 with reference to FIG. 17.

First, the throttle-by-wire control unit 30D is composed of an accelerator pedal position sensor 31 and a target drive shaft torque determining unit 32D.

The accelerator pedal position sensor 31 has the same structure as described above.

Figure 18:
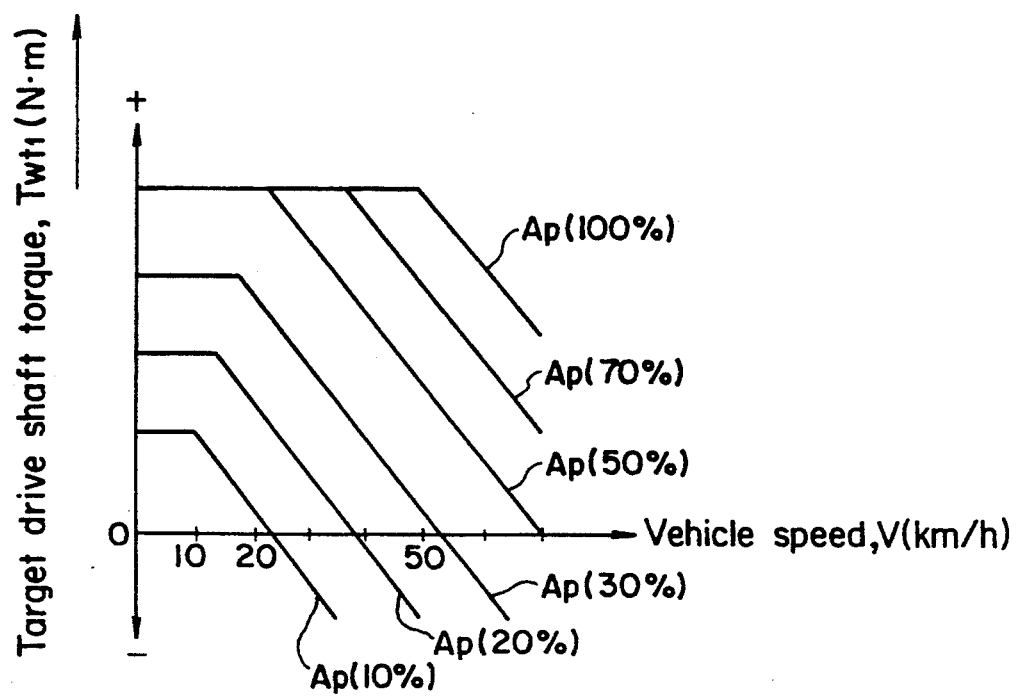

The target drive shaft torque determining unit 32D is adapted to determine the target drive shaft torque $Twt_1$ as conditions for determining the amount of intake air according to the depressed position Ap of the accelerator pedal 20 and the vehicle speed V (the speed Vf of the follower wheels) as parameters. When the vehicle speed V is in a lower-speed range by way of example, the target drive shaft torque determining unit 32D determines a value corresponding exactly to the depressed position Ap of the accelerator pedal 20 irrespective of the vehicle speed V in view of the feeling of acceleration at the time of a start. On the other hand, when the vehicle speed V exceeds a predetermined value, the target drive shaft torque determining unit 32D determines a value which decreases with an increase of the vehicle speed V in view of the stability of speed (the maintenance of speed). Incidentally, FIG. 18 shows one example of conditions for determining the target drive shaft torque $Tnt_1$ referred to above.

The traction control unit 40D comprises a differentiator 41 for determining the acceleration of the vehicle body from the speed Vf of the follower wheels, a reference drive shaft torque calculating unit 42 for calculating a transmittable-to-road reference drive shaft torque Two from the acceleration of the vehicle body determined by the differentiator 41 and the body weight W and wheel diameter R which have been stored as data in advance, a subtracting unit 46 for subtracting the speed Vf of the follower wheels from the speed Vr of the drive wheels to determine the amount of slip DV (=Vr−Vf), a PID adjuster 47D for calculating the amount of feedback operation AT (the amount of torque) from the amount of slip DU obtained by the subtracting unit 46, and an adding unit 48D for adding the operation amount AT obtained by the PID adjuster 47D as a correction value to the reference drive shaft torque Two. At the traction control unit 40D, the second target drive shaft torque $Twt_2$ is obtained based on the reference drive shaft torque Two and the feedback of the amount of slip DV.

Incidentally, the reference engine output torque calculating unit 43 is constructed as described above.

The auto-cruise control unit 50D comprises an actual drive shaft torque calculating unit 56 for calculating an actual drive shaft torque Twm transmitted to the drive shaft, a target vehicle speed determining unit 51 for determining the speed Vf of the follower wheels as a target vehicle speed Vt at the time that the auto-cruise mode is established by the auto-cruise switch 60, a subtracting unit 52 for subtracting the speed Vf of the follower wheels from the target vehicle speed Vt determined by the target vehicle speed determining unit 51 to obtain a speed deviation ΔV therebetween, a PID adjuster 53D for calculating the amount of feedback operation ΔT (the amount of torque) from the speed deviation ΔV obtained by the subtracting unit 52, and an adding unit 54D for adding the feedback operation amount AT obtained by the PID adjuster 53D as a correction value to the actual drive shaft torque Twm from the actual drive shaft torque calculating unit 56. The auto-cruise control unit 50D also determines a third target drive shaft torque $Twt_3$ based on the actual drive shaft torque Twm and the feedback of the speed deviation ΔV.

Figure 19:
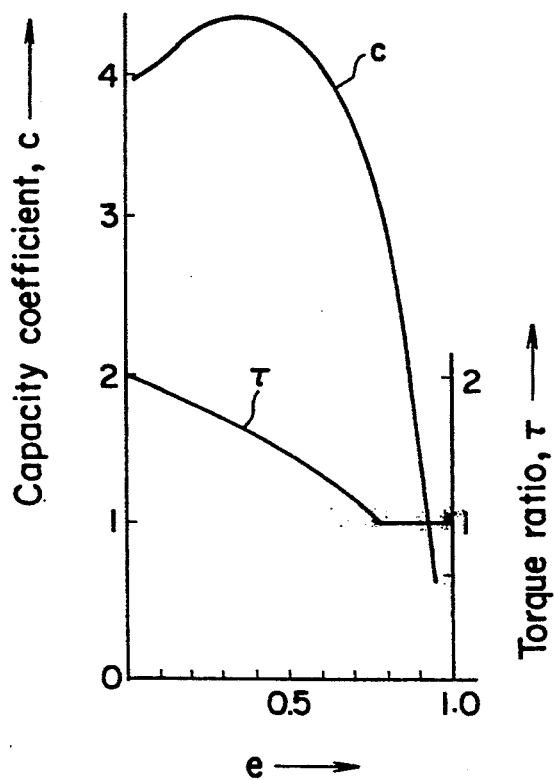

The actual drive shaft torque calculating unit 56 is used to calculate the actual drive shaft torque Twm, using the engine speed Ne detected by an unillustrated engine speed sensor and the torque capacity coefficient C and torque ratio $\tau$ of the torque converter 11 both of which have been stored therein as data, from the following formula:

$$Twm = \tau(e) \, C(e) \, Ne^2$$

Where e is the engine rotating speed ratio of the output shaft of the engine body 4 to the turbine of the torque converter 11. The torque capacity coefficient C and the torque ratio $\tau$ are determined by using the engine rotating speed ratio e as a parameter. These relations are shown in FIG. 19 by way of example.

The main control unit 70D comprises a target drive shaft torque selecting unit 73D as a target-amount-of-control selecting means for selectively outputting one of the target drive shaft torques $Twt_1$, $Twt_2$ and $Twt_3$ each of which has been delivered from each of the control units 30D, 40D, 50D, according to a command from a selection control unit 72D to be described later, a target drive shaft torque comparing unit 71D for performing a comparison among the values of the target drive shaft torques $Twt_1$, $Twt_2$ and $Twt_3$, and a selection control unit 72D for controlling the selecting operation of the selecting unit 73D according to the comparison result from the comparing unit 71D and the operation mode based on the operation of the auto-cruise switch 60 and the value of the slip amount DV from the traction control unit 40D, a target engine output torque calculating unit 76 for calculating the target engine output torque Tet from the target drive shaft torque Twt selected by the selecting unit 73D, a target-amount-of-intake-air calculating unit 75D for calculating the target intake air amount A/Nt from the target engine output torque Tet calculated by the calculating unit 76, and a target-degree-of-opening-of-throttle calculating unit 74 as an amount-of-control-of-engine-output setting means for calculating the target opening degree $\theta_t$ of throttle based on the target intake air amount A/Nt calculated by the target-amount-of-intake-air calculating unit 75D, the engine speed Ne and the intake air amount A/Nr.

Incidentally, the target engine output torque calculating unit 76 is used to calculate the target engine output torque Tet required to obtain the target drive shaft torque Twt by taking into consideration the gear ratio p of the transmission 13 and the torque ratio $\tau$ of the torque converter 11, as shown by the following formula:

$$Tet = Twt/(p\tau)$$

Similarly to the calculating unit 75C in the third embodiment, the target-amount-of-intake-air calculating unit 75D calculates the target intake air amount A/Nt corresponding to the target engine output torque Tet, for example, based on a map (see FIG. 4 for the first embodiment).

The target-degree-of-opening-of-throttle calculating unit 74 is also constructed as in the second and third embodiments (see FIG. 10).

The engine output control apparatus according to the fourth embodiment of this invention is constructed as described above.

Figure 20:
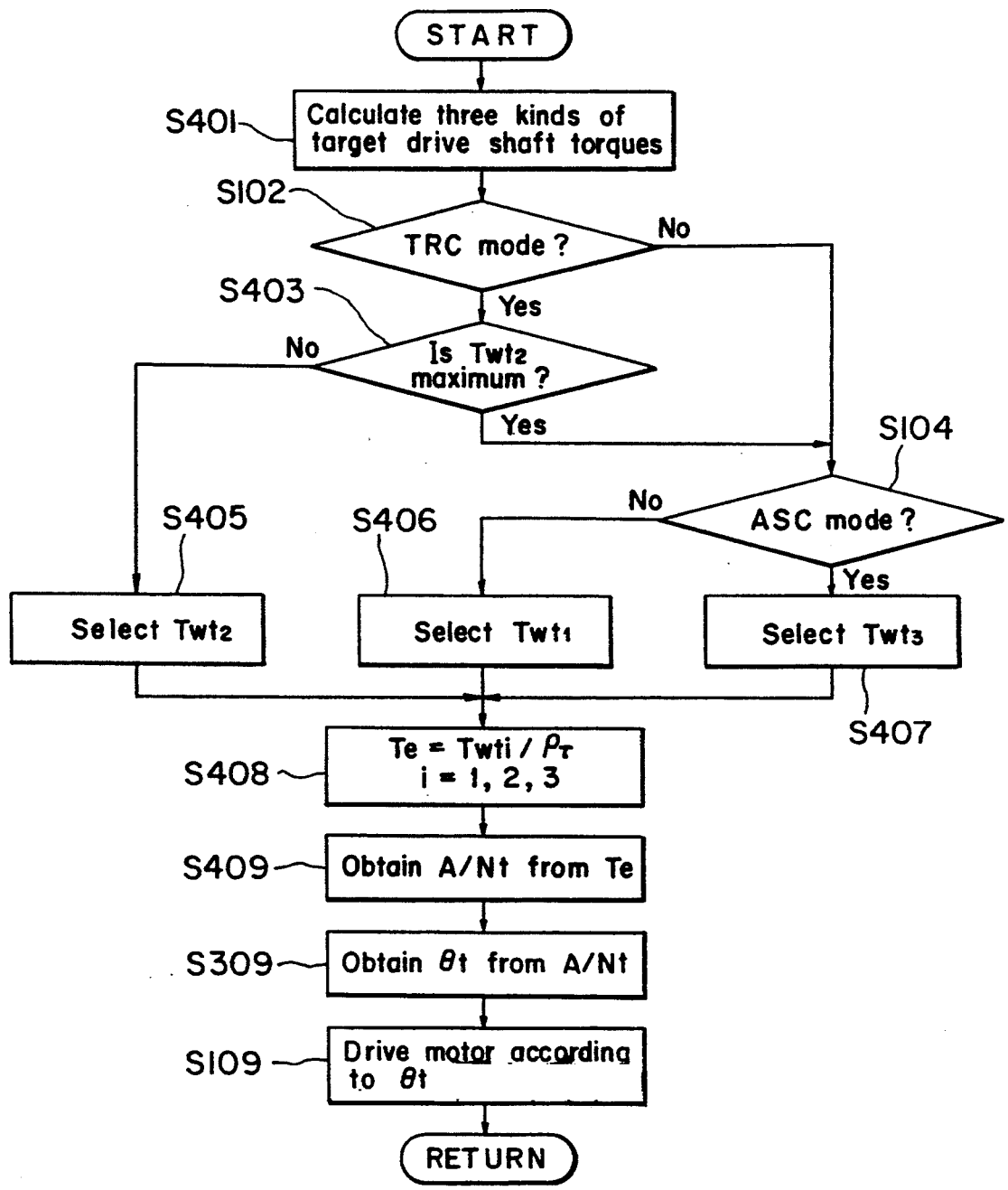

A description will next be made of the operation of the apparatus with reference to FIG. 20.

The first, second and third target drive shaft torques are first calculated in Step 401.

Described more specifically, when the accelerator pedal 20 is depressed, the accelerator pedal position sensor 31 in the throttle-by-wire control unit 30D detects the depressed position Ap of the accelerator pedal 20.

When the vehicle speed V is in a lower-speed range (below a predetermined value) at this time, the target drive shaft torque determining unit 32D determines the first target drive shaft torque $Twt_1$ corresponding exactly to the depressed position Ap of the accelerator pedal 20 irrespective of the vehicle speed V in view of the feeling of acceleration at the time of a start. On the other hand, when the vehicle speed V is in a higher-speed range (above the predetermined value), the target drive shaft torque determining unit 32D determines a first target drive shaft torque $Twt_1$ which decreases with an increase of the vehicle speed V in view of the stability of speed (the maintenance of speed).

The traction control unit 40D determines the slip amount DV as the difference between the speed Vr of the drive wheels and the speed Vf of the follower wheels and also obtains a second target drive shaft torque $Twt_2$ which can cease the slip..

Namely, the differentiator 41 serves to obtain the acceleration of the vehicle body from the speed Vf of the follower wheels, and the reference drive shaft torque calculating unit 42 calculates a transmittable-to-road reference drive shaft torque Two from the acceleration of the vehicle body and the body weight W and wheel diameter R which have been stored therein as data in advance.

At the same time, the subtracting unit 46 subtracts the speed Vf of the follower wheels from the speed Vr of the drive wheels to determine the amount of slip DV (=Vr−Vf), and the PID adjuster 47D determines the operation amount AT (the amount of torque) of feedback from the slip amount DV.

Then, the adding unit 48D adds the thus obtained operation amount ΔT to the reference opening degree $Twt_0$ of throttle as a correction value to determine the second target drive shaft torque $Twt_2$.

On the other hand, the actual drive shaft torque calculating unit 56 in the auto-cruise control unit 50D always calculates the actual drive shaft torque Twm transmitted from the engine body 4 to the drive shaft 14 from the engine speed Ne, the torque capacity coefficient C and the torque ratio $\tau$ of the torque converter 11 and at the same time, monitors the state of the auto-cruise switch 60. When the auto-cruise switch 60 is operated to establish the auto-cruise mode, the target vehicle speed determining unit 51 determines the speed Vf of the follower wheels as the target vehicle speed Vt. Further, the subtracting unit 52 subtracts the speed Vf thereof from the target vehicle speed Vt thus determined to thereby obtain the speed deviation ΔV. Then, the PID adjuster 53D obtains the operation amount ΔT of feedback from the speed deviation ΔV. Furthermore, the adding unit 54D adds the operation amount ΔT thus obtained, as the correction value, to the actual drive shaft torque Twm to determine the third target drive shaft torque $Twt_3$.

Incidentally, when the auto-cruise switch 60 is operated again to release the auto-cruise mode or when a brake pedal or accelerator pedal 20 of the vehicle is depressed, the auto-cruise control unit 50D detects whether or not the auto-cruise mode has been released or detects the state of depressing operation of the brake pedal or accelerator pedal 20 to thereby terminate the determination of the target vehicle speed Vt.

Then, each of the aforementioned target drive shaft torques $Twt_1$, $Twt_2$ and $Twt_3$ is inputted to the main control unit 70D.

The main control unit 70D selects one of the aforementioned target drive shaft torques $Twt_1$, $Twt_2$ and $Twt_3$ according to the operation mode.

Namely, it is judged in Step 102 whether or not the operation mode is the traction mode (TRC mode). Incidentally, as in the preceding embodiments, the TRC mode is set when the slip amount DV from the traction control unit 40D exceeds a predetermined value, but it is not set when the slip amount DV does not exceed the predetermined value.

Unless no TRC mode has been established, the routine procedure proceeds to Step 104, but if it has been established, the routine procedure proceeds to Step 403. In Step 403, the degree-of-opening-of-throttle comparing unit 71D performs a comparison among the values of the target drive shaft torques $Twt_1$, $Twt_2$ and $Twt_3$ from the control units 30D, 40D and 50D and makes a judgment as to whether or not the value of the second target drive shaft torque $Twt_2$ associated with the TRC mode is the maximum.

If the value of $Twt_2$ is the maximum, the routine procedure advances to Step 104. If it is not, the routine procedure proceeds to Step 405 where the second target drive shaft torque $Twt_2$ is selected as the target drive shaft torque. Namely, if the condition that the value of the second target drive shaft torque $Twt_2$ is smaller than any value of the remaining target drive shaft torques $Twt_1$ and $Twt_3$ is met, the second target drive shaft torque $Twt_2$ is chosen.

In a manner similar to the aforementioned first, second and third embodiments, when the slip amount DV exceeds the predetermined value, the traction mode is set up, at which time the traction control makes it necessary to set the second target drive shaft torque $Twt_2$ such that the opening degree $\theta$ of throttle becomes smaller than the current opening degree thereby allowing the slip to cease. However, when the value of the second target drive shaft torque $Twt_2$ is greater than that of each of the remaining target drive shaft torques $Twt_1$ and $Twt_3$, the use of either the target drive shaft torques $Twt_1$ or $Twt_3$ rather than that of the second target drive shaft torque $Twt_2$ is better fitted from the standpoint of the traction control for the purpose of control that the slip be ceased. To this end, the condition that "the value of the second target drive shaft torque $Twt_2$ is not the maximum" is employed as a condition for the second target drive shaft torque $Twt_2$ which can cease the slip.

On the other hand, when the routine procedure advances to Step 104, it is discriminated whether or not the auto-cruise mode (ASC mode) has been established by the auto-cruise switch 60.

When it is discriminated to be positive, the routine procedure proceeds to Step 407 where the third target drive shaft torque $Twt_3$ is chosen as the target drive shaft torque.

When it is discriminated to be negative, the routine procedure advances to Step 306 where the first target drive shaft torque $Twt_1$ is selected as the target drive shaft torque.

In this case, the ASC mode is set by the operation of the auto-cruise switch 60. However, when a command to release the auto-cruise mode is made by reoperation of the auto-cruise switch 60 or when the depression of the brake pedal or accelerator pedal 20 equivalent to the release command of the auto-cruise mode is effected, during running of the vehicle at a constant speed under the ASC mode, the auto-cruise mode is released and the selection of the third target drive shaft torque $Twt_3$ is also released, thereby finishing the running at the constant speed.

As described above, the selecting operation of one ($Twt_i$, where i=1, 2, 3) of the target drive shaft torques $Twt_1$, $Twt_2$ and $Twt_3$ is effected by the selecting unit 73D under the control of the selection control unit 72D.

When the target drive shaft torque Twt is selected, the routine procedure advances to Step 408. There, the target engine output torque calculating unit 76 calculates the target engine output torque Tet required to obtain the target drive shaft torque Twt.

Then, the routine procedure advances to Step 308 where the target-amount-of-intake-air calculating unit 75D calculates the target intake air amount A/Nt required to obtain the target drive shaft torque Twt.

The routine procedure further proceeds to Step 309 where the target degree-of-opening-of-throttle calculating unit 74 calculates the target opening degree $\theta_t$ of throttle from the calculated target intake air amount A/Nt.

Subsequently, in Step 109, the step motor 7 is driven according to the target opening degree $\theta_t$ of throttle so that an adjustment is made to bring the opening degree $\theta$ of the throttle valve 6 into conformity with the target opening degree $\theta_t$ of throttle.

As described above, the main control unit 70D selects the first target drive shaft torque $Twt_1$ delivered from the throttle-by-wire control unit 30D when the condition that the operation is in neither the traction mode nor the auto-cruise mode is met. The main control unit 70D selects the third target drive shaft torque $Twt_3$ delivered from the auto-cruise control unit 50D when the condition that the operation is not in the traction mode but is in the auto-cruise mode is met. Further, the main control unit 70D selects the second target drive shaft torque $Twt_2$ when the condition that the traction mode is established and the value of the second target drive shaft torque $Twt_2$ from the traction control unit 40D is not maximum is met. However, the selection of either the first target drive shaft torque $Twt_1$ or the third target drive shaft torque $Twt_3$ is effected according to whether or not the operation mode is the auto-cruise mode if the value of the second target drive shaft torque $Twt_2$ is the maximum even in the traction mode.

As a result, when the first target drive shaft torque $Twt_1$ is selected, a drive shaft torque corresponding to the depressed position Ap of the accelerator pedal 20 is transmitted to the drive shaft 14 so that the so-called throttle-by-wire control of such a type that the drive shaft torque serves as drive force at the wheels 15 is performed. Then, when the third target drive shaft torque $Twt_3$ is chosen, a drive shaft torque required to permit running of the vehicle at the constant speed is transmitted to the drive shaft 14 so that the so-called auto-cruise control of such a type that the vehicle runs at the constant speed of the target vehicle speed Vt is made. Further, when the second target drive shaft torque $Twt_2$ is chosen, a drive shaft torque which can cease the slip is transmitted to the drive shaft 14 so that the so-called traction control of such a type that the slip of the wheels cease is performed.

As described above, the target drive shaft torques $Twt_1$, $Twt_2$, and $Twt_3$, namely, the same kind parameters are used as control parameters (target amounts of control) in the throttle-by-wire control, the traction control and the auto-cruise control, respectively and one of the target drive shaft torques $Twt_1$, $Twt_2$ and $Twt_3$ is selected according to their respective magnitudes and the operation mode of the vehicle. Thus, in a manner similar to the first, second and third embodiments, the function of each control can be fully exhibited without complication of the opening-degree control of the throttle valve 6. An improvement in safety or the like can be achieved owing to the traction control.

In addition, the means for determining the opening degree $\theta$ of the throttle from the target drive shaft torque Twt can be commonly used for the respective controls.

Accordingly, this embodiment can also perform all the throttle-by-wire control, traction control and auto-cruise control by a single drive-by-wire system unit without dimensional enlargement of the apparatus.

The throttle valve 6 is driven by the step motor 7 in each of the aforementioned embodiments. Alternatively, the throttle valve 6 may be driven by a DC motor. In this case, the DC motor is driven such that the degree-of-opening-of-throttle detected by the throttle opening degree sensor 8 is inputted and the thus-detected degree-of-opening-of-throttle conforms to the target opening degree $\theta$ of throttle. Not necessarily limited to such motor drive, the throttle valve may be driven by hydraulic pressure or pneumatic pressure.

The amount of intake air was employed as a parameter for engine control (control amount) in each of the above embodiments since the embodiments were each described as applied to a gasoline engine by way of example. In the case of a diesel engine, the amount of injected fuel can be used as a parameter for engine control instead of the amount of intake air.

Further, the target amount of control is not limited to those used in the embodiments described above. Other parameters (control amount) can also be used provided that parameters (target amounts of control) employed in the throttle-by-wire control, the traction control, the auto-cruise control, etc., respectively are all of the same kind. In addition, the amount of control for the engine output directly associated with the output control of the engine is not necessarily limited to the degree of opening of the throttle. Other parameters (control amount) such as the number of pulses of a stepper motor can also be used.

Further, the operation of the apparatus of this invention is not necessarily limited to those described in the embodiments described above (see FIGS. 6, 11, 15 and 20). Control in a different sequence or course can be contemplated. Further, the present invention should by no means be limited to the embodiments described above but can be practiced in various modified ways without departing from the gist of the invention.

INDUSTRIAL APPLICABILITY

As has been described above, the engine output control apparatus of this invention makes it possible to perform plurality controls such as the accelerator-by-wire control, traction control and auto-cruise control as a combined single control without complication of the controls. In particular, it is possible to systematically control the running of a vehicle.

We claim:

1. An engine output control apparatus for use in a vehicle having an engine, said apparatus comprising:
   first means for setting a first target engine output torque in accordance with an amount of operation of a manually operated member;
   second means for detecting wheel slippage and for setting, based on the wheel slippage, a second target engine output torque, said second target engine output torque being required to reduce the wheel slippage;
   third means for setting a third target engine output torque required to permit constant-speed running of the vehicle in a state that the manually operated member is not actuated;

selection control means for setting as an operation mode of the vehicle one of three operation modes consisting of a first operation mode, a second operation mode and a third operation mode;

selecting means for selecting said first target engine output torque set by said first target engine output torque setting means when said first operation mode is set by said selection control means, said second target engine output torque set by said second target engine output torque setting means when said second operation mode is set by said selection control means, or said third target engine output torque set by said third target engine output torque setting means when said third operation mode is set by said selection control means;

engine output adjusting means for adjusting an output of the engine;

setting means for setting as an engine output control amount a control amount required for the engine output adjusting means to allow the engine to output a torque equal to the target engine output torque selected by the selecting means;

control means for controlling the engine output adjusting means based on the engine output control amount set by the engine output control amount setting means.

2. An engine output control apparatus as claimed in claim 1, wherein the engine output adjusting means is a throttle valve.

3. An engine output control apparatus as claimed in claim 2, wherein the degree of opening of the throttle valve is used as the engine output control amount.

4. An engine output control apparatus as claimed in claim 1, wherein said engine output control amount setting means determines a target amount of intake air to the engine from the target engine output torque selected by the selecting means.

5. An engine output control apparatus as claimed in claim 1, wherein said selection control means has second operation mode determining means for determining based on the wheel slippage whether said second operation mode should be practiced, and said selection control means selects said second operation mode only when said second operation mode has been determined to be practiced by said second operation mode determining means and said second target engine output torque set by said second target engine output torque setting means is smaller than at least one of said first target engine output torque and said third target engine output torque but otherwise selects one of said first operation mode and said third operation mode.

6. An engine output control apparatus for use in a vehicle having an engine, said apparatus comprising:

first means for setting as a first target drive torque a target value of torque, which is to be transmitted to a vehicle drive shaft, in accordance with an amount of operation of a manually operated member;

second means for detecting wheel slippage and for setting, based on the wheel slippage, a second target drive torque of the vehicle drive shaft, said second target drive torque being required to reduce the wheel slippage;

third means for setting a third target drive torque of the vehicle drive shaft, said third target drive torque being required to permit constant-speed running of the vehicle in a state that the manually operated member is not actuated;

selection control means for setting as an operation mode of the vehicle one of three operation modes consisting of a first operation mode, a second operation mode and a third operation mode;

selecting means for selecting said first target drive torque set by said first target drive torque setting means when said first operation mode is set by said selection control means, said second target drive torque set by said second target drive torque setting means when said second operation mode is set by said selection control means, or said third target drive torque set by said third target drive setting means when said third operation mode is set by said selection control means;

engine output adjusting means for adjusting an output of the engine;

setting means for setting as an engine output control amount a control amount, which is required for the engine output adjusting means to allow the engine to output to the vehicle drive shaft a torque equal to the target drive torque selected by the selecting means, on the basis of the target drive torque and a gear ratio of a speed stage which is in use in a transmission of said vehicle; and control means for controlling the engine output adjusting means based on the engine output control amount set by the engine output control amount setting means.

7. An engine output control apparatus as claimed in claim 6, wherein said engine output control amount setting means determines the target engine output torque required to transmit to the vehicle drive shaft the torque equal to the target drive torque selected by the selecting means and also determines a target amount of intake air to the engine, said target amount of intake air being required to allow the engine to output the torque equal to the target output torque, and sets the engine output control amount based on the target amount of intake air.

8. An engine output control apparatus as claimed in claim 6, wherein the manually operated member is an accelerator pedal.

9. An engine output control apparatus as claimed in claim 6, wherein said selection control means has second operation mode determining means for determining based on the wheel slippage whether said second operation mode should be practiced, and said selection control means selects said second operation mode only when said second operation mode has been determined to be practiced by said second operation mode determining means and said second target drive torque set by said second target drive torque setting means is smaller than at least one of said first target drive torque and said third target drive torque but otherwise selects one of said first operation mode and said third operation mode.

10. A method for controlling output of a vehicle engine, said method comprising the steps of:

setting a first target engine control amount in accordance with an amount of operation of a manually operated member;

detecting wheel slippage;

setting a second target engine control amount, based on the wheel slippage, said second target engine control amount being required to reduce slippage;

detecting whether the manually operated member has been actuated;

setting a third target engine control amount required to permit constant-speed running of the vehicle when the manually operated member has not been actuated;

setting as an operation mode of the vehicle one of three operation modes consisting of a first operation mode, a second operation mode and a third operation mode;

selecting said first target engine control amount when said first operation mode is set, said second target engine control amount when said second operation mode is set, or said third target engine control amount when said third operation mode is set;

setting as an engine output control amount a control amount required for an engine output adjusting means to allow the engine to output a torque equal to the selected target engine control amount; and controlling the engine output adjusting means based on the set engine output control amount.

11. A method as claimed in claim 10, wherein the selecting step comprises the step of:

performing a comparison between the first, second, and third target engine control amounts when wheel slippage has been detected and selecting the second target engine control amount if it is not larger than one of the first and third target engine control amounts.

12. A method as claimed in claim 10, wherein the selecting step further comprises the step of:

selecting the third target engine control amount when wheel slippage has not been detected and the manually operated member has been actuated.

13. A method as claimed in claim 10, wherein the selecting step further comprises the step of:

selecting the first target engine control amount when wheel slippage has not been detected and the manually operated member has not been actuated.

14. A method as claimed in claim 10, wherein the selecting step comprises the steps of:

performing a comparison between the first, second, and third target engine control amounts when wheel slippage has been detected and selecting the second target engine control amount if it is not larger than one of the first and third target engine control amounts;

selecting the third target engine control amount when wheel slippage has not been detected and the manually operated member has been actuated; and selecting the first target engine control amount when wheel slippage has not been detected and the manually operated member has not been actuated.

15. A method as claimed in claim 10, wherein the setting an operation mode step comprises the steps of:

determining based on the wheel slippage whether said second operation mode should be practiced, and selecting said second operation mode only when said second operation mode has been determined to be practiced and said second target engine control amount is smaller than at least one of said first target engine control amount and said third target engine control amount but otherwise selecting one of said first operation mode and said third operation mode.

16. A method for controlling output of a vehicle engine, said method comprising the steps of:

setting a first target amount of engine output torque in accordance with an amount of operation of a manually operated member;

detecting wheel slippage;

setting, based on the wheel slippage, a second target engine output torque, said second target engine output torque being required to reduce slippage;

detecting whether the manually operated member has been actuated;

setting a third target engine output torque required to permit constant-speed running of the vehicle when the manually operated member has not been actuated;

setting as an operation mode of the vehicle one of three operation modes consisting of a first operation mode, a second operation mode and a third operation modes;

selecting said first target engine control amount when said first operation mode is set, said second target engine control amount when said second operation mode is set, or said third target engine control amount when said third operation mode is set;

setting as an engine output control amount a control amount required for an engine output adjusting means to allow the engine to output a torque equal to the selected target engine output torque; and controlling the engine output adjusting means based on the set engine output control amount.

17. A method as claimed in claim 16, wherein the selecting step comprises the step of:

performing a comparison between the first, second, and third target amounts of engine output torque when wheel slippage has been detected and selecting the second target amount of engine output torque if it is not larger than one of the first and third target amounts of engine output torque.

18. A method as claimed in claim 16, wherein the selecting step further comprises the step of:

selecting the third target amount of engine output torque when wheel slippage has not been detected and the manually operated member has been actuated.

19. A method as claimed in claim 16, wherein the selecting step further comprises the step of:

selecting the first target amount of engine output torque when wheel slippage has not been detected and the manually operated member has not been actuated.

20. A method as claimed in claim 16, wherein the selecting step comprises the steps of:

performing a comparison between the first, second, and third target amounts of engine output torque when wheel slippage has been detected and selecting the second target amount of engine output torque if it is not larger than one of the first and third target amounts of engine output torque;

selecting the third target amount of engine output torque when wheel slippage has not been detected and the manually operated constant-speed control member has been actuated; and selecting the first target amount of engine output torque when wheel slippage has not been detected and the manually operated constant-speed control member has not been actuated.

21. A method as claimed in claim 16, wherein the setting an operation mode step comprises the steps of:

determining based on the wheel slippage whether said second operation mode should be practiced, and selecting said second operation mode only when said second operation mode has been determined to be practiced and said second target engine output torque is smaller than at least one of said first target engine output torque and said third target engine output torque but otherwise selecting one of said first operation mode and said third operation mode.

* * * * *